(12) United States Patent
Xie et al.

(10) Patent No.: US 11,275,456 B2
(45) Date of Patent: Mar. 15, 2022

(54) FINGER-WEARABLE INPUT ASSEMBLY FOR CONTROLLING AN ELECTRONIC DEVICE

(71) Applicant: Apple Inc., Cupertino, CA (US)

(72) Inventors: Jun Xie, San Jose, CA (US); Xianwei Zhao, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/834,888

(22) Filed: Mar. 30, 2020

(65) Prior Publication Data

US 2021/0096660 A1    Apr. 1, 2021

Related U.S. Application Data

(60) Provisional application No. 62/907,083, filed on Sep. 27, 2019.

(51) Int. Cl.
*G06F 3/038* (2013.01)
*G06F 3/041* (2006.01)

(52) U.S. Cl.
CPC ............ *G06F 3/038* (2013.01); *G06F 3/0412* (2013.01); *G06F 3/04162* (2019.05); *G06F 2203/0331* (2013.01); *G06F 2203/0384* (2013.01); *G06F 2203/04104* (2013.01); *G06F 2203/04107* (2013.01)

(58) Field of Classification Search
CPC .... G06F 3/038; G06F 3/0412; G06F 3/04162; G06F 2203/04107; G06F 2203/0384; G06F 2203/0331; G06F 2203/04104
See application file for complete search history.

(56) References Cited

U.S. PATENT DOCUMENTS

| 8,570,273 | B1* | 10/2013 | Smith | G06F 3/03547 345/156 |
| 10,139,906 | B1* | 11/2018 | Bai | G06F 3/017 |
| 10,317,940 | B2 | 6/2019 | Eim et al. | |
| 10,635,173 | B2 | 4/2020 | Lim et al. | |
| 2003/0214481 | A1* | 11/2003 | Xiong | G06F 3/038 345/157 |
| 2006/0001646 | A1* | 1/2006 | Hai | G06F 3/014 345/156 |
| 2007/0268268 | A1 | 11/2007 | Allison | |
| 2011/0007035 | A1 | 1/2011 | Shai | |
| 2012/0293410 | A1 | 11/2012 | Bell | |
| 2013/0027341 | A1* | 1/2013 | Mastandrea | G06F 3/038 345/173 |

(Continued)

FOREIGN PATENT DOCUMENTS

WO    WO 2015/102175    *    7/2015
WO    2018/030887 A1         2/2018

OTHER PUBLICATIONS

AMS Datasheet TMG3992 Gesture, Color, ALS, and Proximity Sensor Module with mobeam (TM) Barcode Emulation v1, 06, Feb. 27, 2018, 95 pages.

(Continued)

*Primary Examiner* — Md Saiful A Siddiqui
(74) *Attorney, Agent, or Firm* — Kubota & Basol LLP

(57) ABSTRACT

Finger-wearable input assemblies for controlling an electronic device and methods for using finger-wearable input assemblies for controlling an electronic device are provided.

20 Claims, 17 Drawing Sheets

(56) References Cited

U.S. PATENT DOCUMENTS

| | | | |
|---|---|---|---|
| 2013/0135223 A1* | 5/2013 | Shai | G06F 3/014 |
| | | | 345/173 |
| 2015/0208967 A1* | 7/2015 | Tateda | A61B 5/14552 |
| | | | 600/324 |
| 2017/0108939 A1* | 4/2017 | Chilmulwar | G06F 3/0362 |
| 2017/0147138 A1* | 5/2017 | Dow | G06F 3/0227 |
| 2018/0052517 A1 | 2/2018 | Bulgarelli et al. | |
| 2018/0193198 A1* | 7/2018 | Li | A61F 11/04 |
| 2018/0239429 A1* | 8/2018 | Gupta | G06F 3/0346 |
| 2019/0015014 A1 | 1/2019 | Lange | |
| 2019/0038222 A1 | 2/2019 | Krimon et al. | |
| 2019/0155385 A1* | 5/2019 | Lim | H04L 63/0861 |
| 2020/0142497 A1* | 5/2020 | Zhu | G06F 3/017 |

OTHER PUBLICATIONS

AMS Datasheet TMG49037 Gesture, Color and Proximity Sensor Module v1-01, Aug. 20, 2019, 78 pages.

Nordic Semiconductor nRF52832 Multiprotocol Bluetooth 5, ANT/ANT+ and 2.4GHz Proprietary System-on-Chip, Product Brief Version 2.0, retrieved on Apr. 4, 2019, 2 pages.

Tsukada et al., "Ubi-Finger: Gesture Input Device for Mobile Use." Information Processing Society of Japan, 8 pages, Jan. 2002.

Han et al., "Frictio: Passive Kinesthetic Force Feedback for Smart Ring Output", Association for Computing Machinery, Oct. 22-25, 2017, 12 pages.

International Search Report received for PCT Patent Application No. PCT/US2020/040102, dated Sep. 24, 2020, 4 pages.

* cited by examiner

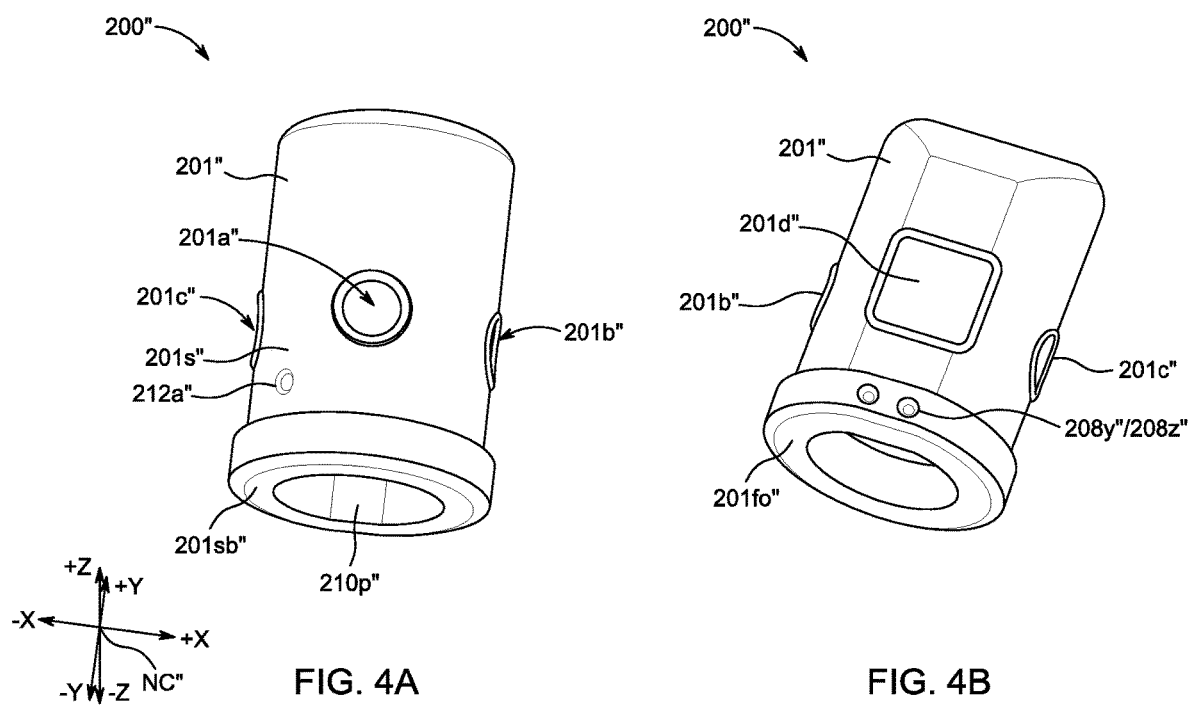

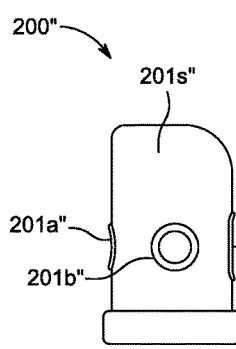 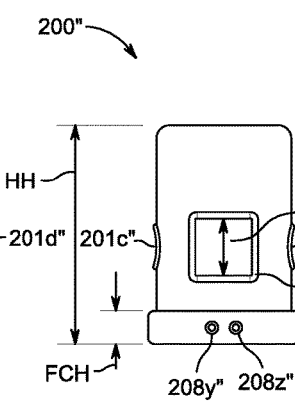 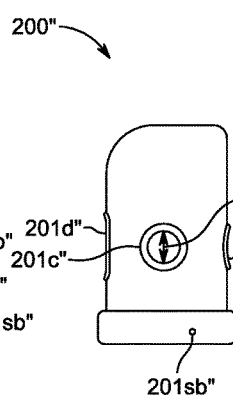 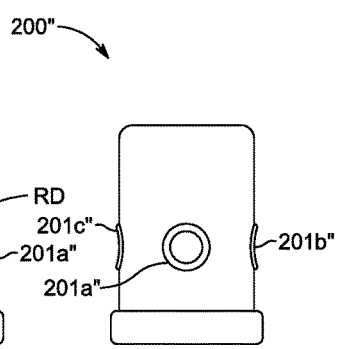
FIG. 4C  FIG. 4D  FIG. 4E  FIG. 4F
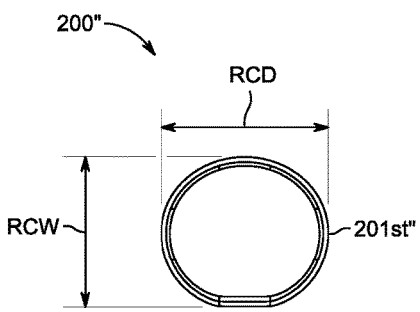 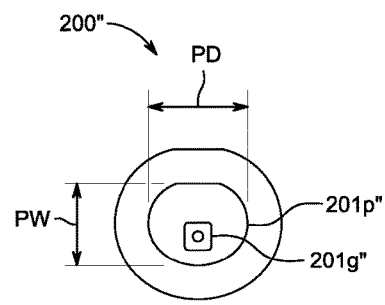
FIG. 4G  FIG. 4H

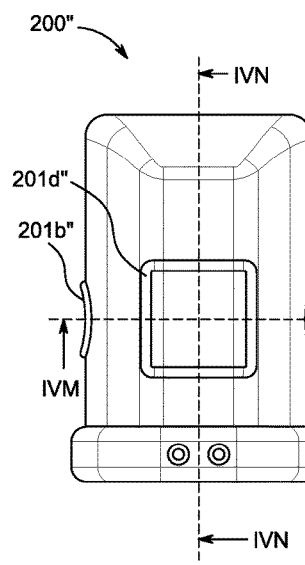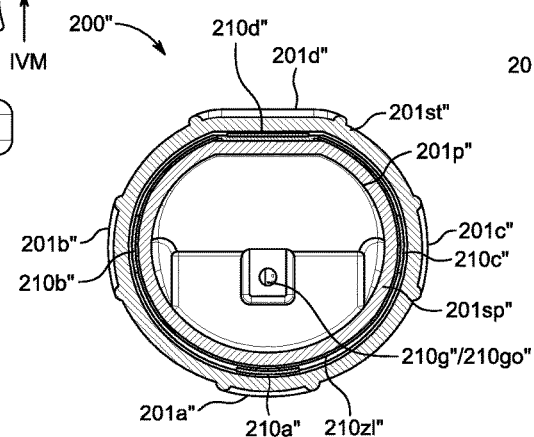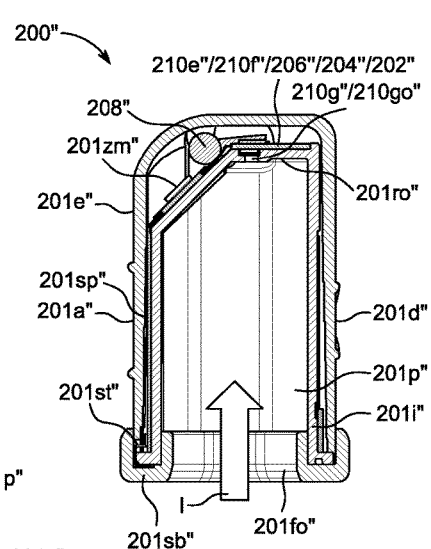
FIG. 4L
FIG. 4M
FIG. 4N

FINGER-WEARABLE INPUT ASSEMBLY FOR CONTROLLING AN ELECTRONIC DEVICE

CROSS-REFERENCE TO RELATED APPLICATION(S)

This application claims the benefit of prior filed U.S. Provisional Patent Application No. 62/907,083, filed Sep. 27, 2019, which is hereby incorporated by reference herein in its entirety.

FIELD

This generally relates to an input assembly for controlling an electronic device and, more particularly, to a finger-wearable input assembly for controlling an electronic device.

BACKGROUND

Some systems may include an electronic device operative to provide a user interface, as well as an electronic input assembly that may be manipulated by a user for generating user control signals operative to adjust the user interface. However, existing systems are often inefficient and/or ineffective and they often limit the ways by which a user may interact with an input assembly to generate particular user control signals.

SUMMARY

Finger-wearable input assemblies and methods for using finger-wearable input assemblies for controlling an electronic device are provided.

As an example, an input assembly for controlling an electronic device may be provided that includes a housing structure providing an external surface and an internal surface that at least partially defines a passageway operative to receive a first digit of a user's hand for wearing the input assembly, a plurality of sensors at least partially protected by the housing structure, the plurality of sensors including a first sensor operative to detect, at a first portion of the external surface, a first touch event by a second digit of the user's hand when the input assembly is worn by the first digit, and a second sensor operative to detect, at a second portion of the external surface, a second touch event by a third digit of the user's hand when the input assembly is worn by the first digit, and a processor operative to generate control data based on the first touch event and the second touch event for at least partially controlling an action of a user interface of the electronic device.

As another example, an input assembly for controlling an electronic device may be provided that includes a housing structure providing an external surface and an internal surface that at least partially defines a passageway operative to receive a first digit of a user's hand for wearing the input assembly, a plurality of sensors at least partially protected by the housing structure, the plurality of sensors including a first sensor operative to detect, within the passageway, a characteristic of the first digit when the input assembly is worn by the first digit and a second sensor operative to detect, at a portion of the external surface, a touch event by a second digit of the user's hand when the input assembly is worn by the first digit, and a processor operative to generate control data based on the characteristic and the touch event for at least partially controlling an action of the electronic device.

As yet another example, an input assembly for controlling an electronic device may be provided that includes a housing structure providing an external surface and an internal surface that at least partially defines a passageway operative to receive a first digit of a user's hand for wearing the input assembly, a plurality of sensors at least partially protected by the housing structure, the plurality of sensors including a first sensor operative to detect, at a first portion of the external surface, a first touch event by any digit of the user's hand other than the first digit when the input assembly is worn by the first digit, a second sensor operative to detect, at a second portion of the external surface, a second touch event by any digit of the user's hand other than the first digit when the input assembly is worn by the first digit, and a motion sensor operative to detect a motion event of the first digit when the input assembly is worn by the first digit, and a processor operative to generate first control data based on simultaneous detection of the first touch event and the motion event for at least partially controlling a first action of the electronic device and second control data based on simultaneous detection of the second touch event and the motion event for at least partially controlling a second action of the electronic device that is different than the first action.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 4A is a top, front perspective view of yet another exemplary input assembly;

FIG. 4B is a bottom, front perspective view of the exemplary input assembly of FIG. 4A;

FIG. 4C is a right side view of the exemplary input assembly of FIGS. 4A and 4B;

FIG. 4D is a bottom view of the exemplary input assembly of FIGS. 4A-4C;

FIG. 4E is a left side view of the exemplary input assembly of FIGS. 4A-4D;

FIG. 4F is a top view of the exemplary input assembly of FIGS. 4A-4E;

FIG. 4G is a rear view of the exemplary input assembly of FIGS. 4A-4F;

FIG. 4H is a front view of the exemplary input assembly of FIGS. 4A-4G;

FIG. 4L is a bottom view of the exemplary input assembly of FIGS. 4A-4K;

FIG. 4M is a cross-sectional view of the exemplary input assembly of FIGS. 4A-4L, taken from line IVM-IVM of FIG. 4L;

FIG. 4N is a cross-sectional view of the exemplary input assembly of FIGS. 4A-4M, taken from line IVN-IVN of FIG. 4L.

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

The present disclosure relates to finger-wearable input assemblies and methods for using finger-wearable input assemblies for controlling an electronic device. A cuboid or cylindrical housing of an assembly may define a hollow passageway in which one finger of a user's hand may be positioned for wearing the assembly, while other fingers of the hand may provide touch user inputs to various touch sensor input components provided on an exterior of the housing about the passageway. For example, one or more electromechanical switches and one or more trackpads may be provided at different portions of a periphery extending about the hollow passageway of the assembly, and the different sensors may simultaneously detect different inputs from different fingers of the user, while the detected inputs may be used to generate control data operative to control a user interface of an electronic device that may be communicatively coupled (e.g., wirelessly) to the input assembly. Any suitable motion sensor may also be provided by the input assembly to determine movement (e.g., translation and/or rotation) of the input assembly housing in three-dimensional space, and such movement may be used in combination with any combination of detected touch sensor inputs to control the electronic device user interface.

Finger-wearable input assemblies and methods for using finger-wearable input assemblies for controlling an electronic device are provided and described with reference to FIGS. 1-6.

Figure 1:
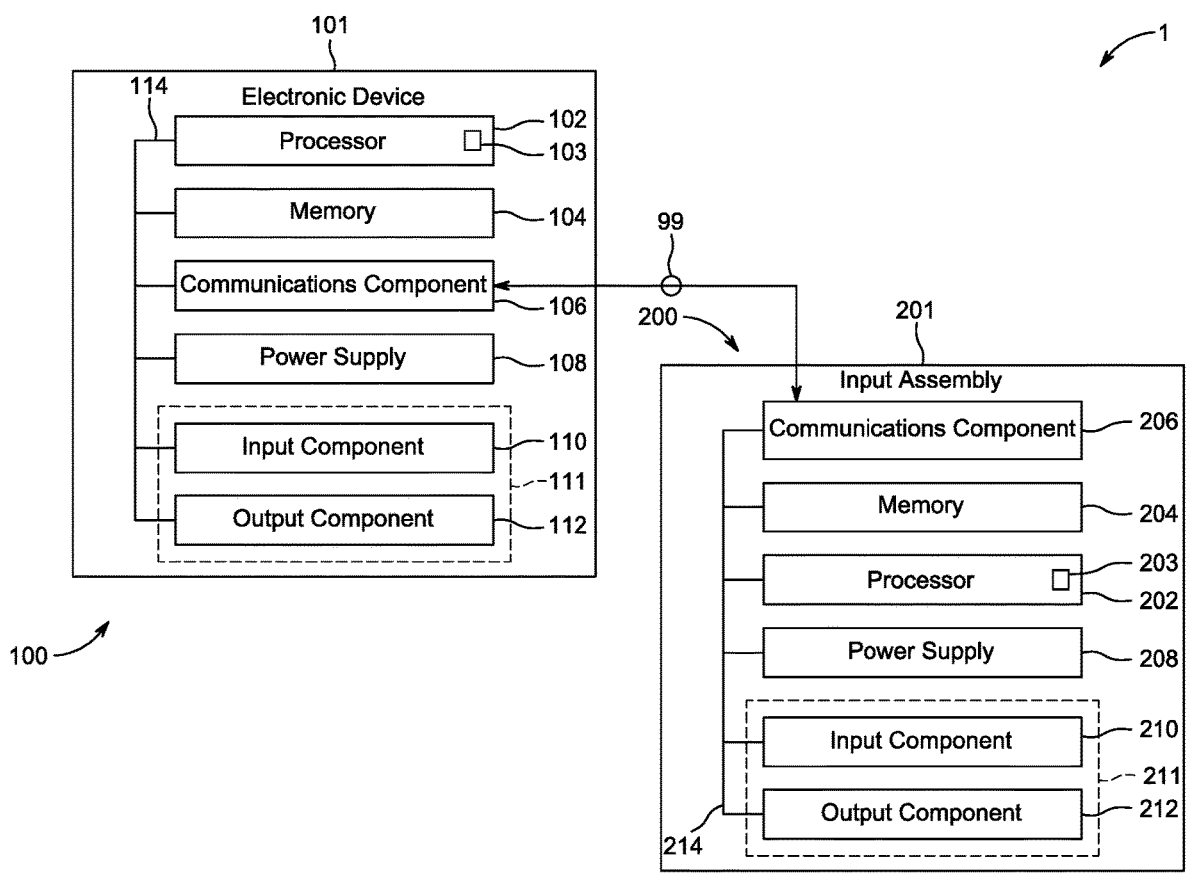
FIG. 1 is a schematic view of an illustrative user input system including an electronic device and an electronic input assembly.

FIG. 1 is a schematic view of an illustrative system 1 with an electronic device 100 and an electronic input assembly 200. Input assembly 200 (e.g., a finger-wearable, user-manipulated electronic input device) may be configured to provide input to electronic device 100 (e.g., a tablet computer, laptop computer, desktop computer, etc.), such as for controlling a user interface provided by the electronic device. As shown in at least FIGS. 2A, 2C, and 2D, a system user U may wear input assembly 200 on any suitable digit of any hand (e.g., index finger IF or middle finger MF or thumb TM of right hand RH) and may then physically interact with input assembly 200 in any suitable manner, including, but not limited to, squeeze, rub, tap, press, touch, move in any of at least six degrees of freedom in three-dimensional space (e.g., relative to electronic device 100) (e.g., change position through translation along a first axis Y (e.g., surge (e.g., forwardly in the +Y-direction or rearwardly in the −Y-direction)), change position through translation along a second axis Z (e.g., heave (e.g., upwardly in the +Z-direction or downwardly in the −Z-direction)), change position through translation along a third axis X (e.g., sway (e.g., rightwardly in the +X-direction or leftwardly in the −X-direction)), change orientation through rotation about the first axis Y (e.g., roll (e.g., clockwise or counterclockwise about longitudinal axis Y)), change orientation through rotation about the second axis Z (e.g., yaw (e.g., clockwise or counterclockwise about normal axis Z)), and/or change orientation through rotation about the third axis X (e.g., pitch (e.g., clockwise or counterclockwise about transverse axis X))), or otherwise physically manipulate input assembly 200 in any suitable manner to convey information to electronic device 100 for controlling electronic device 100 in any suitable manner, such as for controlling or otherwise interacting with a user interface provided by electronic device 100. In many embodiments, the user interface provided by electronic device 100 may be a graphical or otherwise visual user interface that may be presented by a display output component of electronic device 100. However, in other embodiments, the user interface provided by electronic device 100 may be an at least partially non-visual user interface that may instead provide audible and/or tactile information to the user. Collectively, input assembly 200 and electronic device 100 may be referred to herein as a "user input" system 1.

Broadly and generally, system 1 may be operative to determine and/or estimate a current user orientation or position of at least one body part of user U (e.g., a fingertip, set of fingertips, (e.g., tip of any digit(s) (e.g., thumb and/or fingers)), etc.) with respect to at least one physical feature of input assembly 200 as well as to detect and/or estimate a current physical movement of input assembly 200 in three-dimensional space (e.g., relative to electronic device 100). System 1 may also be operative to use both the determined user orientation/position and the detected physical movement to define one or more particular control commands for controlling electronic device 100 (e.g., for controlling a user interface provided by electronic device 100).

Electronic device 100 may be any portable, mobile, or hand-held electronic device configured to receive control signals from input assembly 200 for controlling a user interface of electronic device 100. Alternatively, electronic device 100 may not be portable at all, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc. or a headset for providing virtual reality and/or augmented reality display of content to a wearing user, etc.), boom box, modem, router, printer, and combinations thereof. Electronic device 100 may include any suitable control circuitry or processor 102, memory 104, communications component 106, power supply 108, input component 110, and output component 112. Electronic device 100 may also include a bus 114 that may provide one or more wired or wireless communication links or paths for transferring data and/or power to, from, or between various other components of device 100. Device 100 may also be provided with a housing 101 that may at least partially enclose one or more of the components of device 100 for protection from debris and other degrading forces external to device 100. In some embodiments, one or more of the components may be provided within its own housing (e.g., output component 112 may be an independent display within its own housing that may wirelessly or through a wire communicate with processor 102, which may be provided within its own housing). In some embodiments, one or more components of electronic device 100 may be combined or omitted. Moreover, electronic device 100 may include other components not combined or included in FIG. 1. For example, device 100 may include any other suitable components or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., applications for implementing functions on device 100 (e.g., virtual drawing space or other user interface applications)), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection (e.g., with input assembly 200)), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., input assembly 200) using any suitable communications protocol(s). For example, communications component 106 may support Wi-Fi (e.g., an 802.11 protocol), Ethernet, Bluetooth™, Bluetooth™ Low Energy, Bluetooth™ Mesh (e.g., allowing for many-to-many communication over Bluetooth™ radio (e.g., enabling many input assemblies 200 (e.g., of one or multiple users) to communicate simultaneously or near simultaneously with device 100)), near field communication ("NFC"), radio-frequency identification ("RFID"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications component 106 may also include circuitry that can enable device 100 to be communicatively coupled to another device or server or subsystem (e.g., input assembly 200) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100 and/or to sense certain information about the ambient environment. For example, input component 110 can take a variety of forms, including, but not limited to, a touch pad, trackpad, dial, click wheel, scroll wheel, touch screen, one or more buttons (e.g., a keyboard), mouse, joy stick, track ball, switch, photocell, force-sensing resistor ("FSR"), encoder (e.g., rotary encoder and/or shaft encoder that may convert an angular position or motion of a shaft or axle to an analog or digital code), microphone, camera, scanner (e.g., a barcode scanner or any other suitable scanner that may obtain product identifying information from a code, such as a linear barcode, a matrix barcode (e.g., a quick response ("QR") code), or the like), proximity sensor (e.g., capacitive proximity sensor), biometric sensor (e.g., a fingerprint reader or other feature recognition sensor, which may operate in conjunction with a feature-processing application that may be accessible to electronic device 100 for authenticating or otherwise identifying or detecting a user), line-in connector for data and/or power, force sensor (e.g., any suitable capacitive sensors, pressure sensors, strain gauges, sensing plates (e.g., capacitive and/or strain sensing plates), etc.), temperature sensor (e.g., thermistor, thermocouple, thermometer, silicon bandgap temperature sensor, bimetal sensor, etc.) for detecting the temperature of a portion of electronic device 100 or an ambient environment thereof, a performance analyzer for detecting an application characteristic related to the current operation of one or more components of electronic device 100 (e.g., processor 102), motion sensor (e.g., single axis or multi axis accelerometers, angular rate or inertial sensors (e.g., optical gyroscopes, vibrating gyroscopes, gas rate gyroscopes, or ring gyroscopes), linear velocity sensors, and/or the like), magnetometer (e.g., scalar or vector magnetometer), pressure sensor, light sensor (e.g., ambient light sensor ("ALS"), infrared ("IR") sensor, etc.), touch sensor, hover (e.g., finger hover or near touch) sensor (e.g., one or more ultrasonic transducers or receivers and/or far field capacitive sensing and/or the like), thermal sensor, acoustic sensor, sonic or sonar sensor, radar sensor, image sensor (e.g., for detecting light emitted by a light sensor bar of assembly 200 (e.g., an array of light-emitting elements (e.g., any collection that may be configured to interact with any suitable image sensor of assembly 100 for calculating the distance and/or angle between assembly 200 and device 100 (e.g., using triangulation)))), video sensor, global positioning system ("GPS") detector, radio frequency ("RF") detector, RF or acoustic Doppler detector, RF triangulation detector, electrical charge sensor, peripheral device detector, event counter, and any combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. An output component of electronic device 100 may take various forms, including, but not limited to, audio speakers, headphones, data and/or power line-outs, visual displays (e.g., for transmitting data via visible light and/or via invisible light), sensor bars (e.g., an array of light-emitting elements (e.g., any collection that may be configured to interact with any suitable image sensor of assembly 200 for calculating the distance and/or angle between assembly 200 and device 100 (e.g., using triangulation))), antennas, infrared ports, flashes (e.g., light sources for providing artificial light for illuminating an environment of the device), tactile/haptic outputs (e.g., rumblers, vibrators, etc.), taptic components (e.g., components that are operative to provide tactile sensations in the form of vibrations), and any combinations thereof.

For example, electronic device 100 may include a display as output component 112. Display 112 may include any suitable type of display or interface for presenting visual data to a user. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, an organic electroluminescence display, electronic ink, or another type of display technology or combination of display technology types. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera. In some embodiments, display 112 may include display driver circuitry, circuitry for driving display drivers, or both. Display 112 can be operative to display content (e.g., media playback information, application screens for applications implemented on electronic device 100, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations, for which an interface can be displayed, or can instead or in addition be operative to display an interface along any orientation selected by a user.

It should be noted that one or more input components 110 and one or more output components 112 may sometimes be referred to collectively herein as an input/output ("I/O") component or I/O interface 111 (e.g., input component 110 and display 112 as I/O component or I/O interface 111). For example, input component 110 and display 112 may sometimes be a single I/O component 111, such as a touch screen, that may receive input information through a user's and/or stylus' touch of a display screen and that may also provide visual information to a user via that same display screen. Input component 110 of electronic device 100 may provide an input surface relative to which a system user may manipulate the orientation and position of assembly 200 to convey information to electronic device 100. In many embodiments, such an input surface of input component 110 of electronic device 100 may be provided as a portion of a multi-touch display screen assembly (e.g., as a portion of I/O interface 111 with a display output component 112). However, in other embodiments, such an input surface of input component 110 of electronic device 100 may be a non-display input surface, such as, but not limited to, a trackpad or drawing tablet, whether or not device 100 may also include a display output component.

Processor 102 of device 100 may include any processing circuitry operative to control the operations and performance of one or more components of electronic device 100. For example, processor 102 may be used to run one or more applications, such as an application 103. Application 103 may include, but is not limited to, one or more operating system applications, firmware applications, user interface applications, media playback applications, media editing applications, pass applications, calendar applications, state determination applications (e.g., device state determination applications, input assembly state determination applications, etc.), biometric feature-processing applications, compass applications, health applications, thermometer applications, weather applications, thermal management applications, force sensing applications, device diagnostic applications, video game applications, or any other suitable applications. For example, processor 102 may load application 103 as a user interface program or any other suitable program to determine how instructions or data received via an input component 110 and/or any other component of device 100 (e.g., input assembly data (e.g., any suitable data 99) from input assembly 200 via communications component 106, etc.) may manipulate the one or more ways in which information may be stored on device 100 (e.g., in memory 104) and/or provided to a user via an output component 112 and/or to a remote subsystem (e.g., device output data (e.g., any suitable data 99) to input assembly 200 via communications component 106). Application 103 may be accessed by processor 102 from any suitable source, such as from memory 104 (e.g., via bus 114) or from another device or server (e.g., from input assembly 200 via communications component 106, and/or from any other suitable remote source via communications component 106). Electronic device 100 (e.g., processor 102, memory 104, or any other components available to device 100) may be configured to process graphical data at various resolutions, frequencies, intensities, and various other characteristics as may be appropriate for the capabilities and resources of device 100. Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes. Processor 102 may be implemented as any electronic device capable of processing, receiving, or transmitting data or instructions. For example, processor 102 can be a microprocessor, a central processing unit, an application-specific integrated circuit, a field-programmable gate array, a digital signal processor, an analog circuit, a digital circuit, or combination of such devices. Processor 102 may be a single-thread or multi-thread processor. Processor 102 may be a single-core or multi-core processor. Accordingly, as described herein, the term "processor" may refer to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

Input assembly 200 may be any suitable electronic user input tool, mouse, trackpad, user-manipulated electronic input device, finger-wearable input device, and/or the like that may be configured to provide control signals or other input to electronic device 100. Input assembly 200 may include any suitable control circuitry or processor 202, which may be similar to any suitable processor 102 of device 100, application 203, which may be similar to any suitable application 103 of device 100, memory 204, which may be similar to any suitable memory 104 of device 100, communications component 206, which may be similar to any suitable communications component 106 of device 100, power supply 208, which may be similar to any suitable power supply 108 of device 100, input component 210, which may be similar to any suitable input component 110 of device 100, output component 212, which may be similar to any suitable output component 112 of device 100, I/O interface 211, which may be similar to any suitable I/O interface 111 of device 100, bus 214, which may be similar to any suitable bus 114 of device 100, and/or housing 201, which may be similar to any suitable housing 101 of device 100. In some embodiments, one or more components of input assembly 200 may be combined or omitted. Moreover, input assembly 200 may include other components not combined or included in FIG. 1. For example, input assembly 200 may include any other suitable components or several instances of the components shown in FIG. 1. For the sake of simplicity, only one of each of the components is shown in FIG. 1. Input assembly 200 and electronic device 100 may be operative to communicate any suitable data 99 (e.g., control data signals) between communication components 206 and 106 using any suitable communication protocol(s).

Figure 1A:
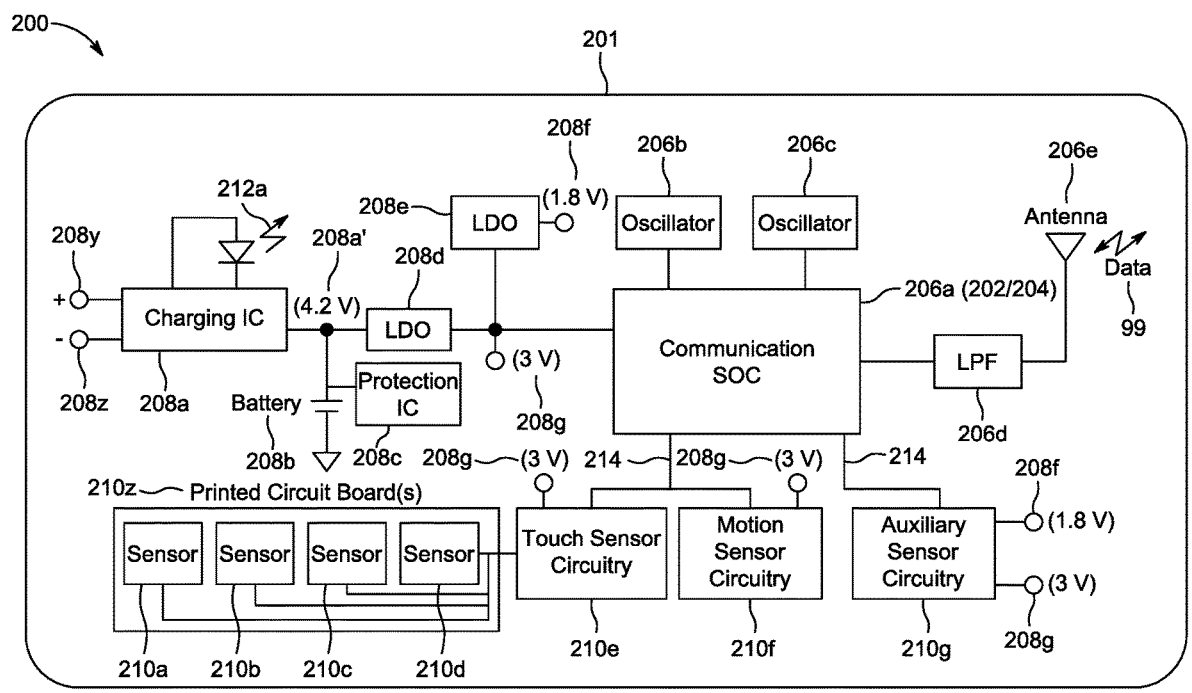
FIG. 1A is another schematic view of the electronic input assembly of FIG. 1.

FIG. 1A shows a more detailed schematic of just one possible embodiment of input assembly 200. As shown, power supply 208 may include a positive electrode 208$y$ and a negative electrode 208$z$ that may be accessible (e.g., via housing 201) by a charging accessory (e.g., a cradle accessory (e.g., with wireless power receiving circuits and/or USB type C connector and/or receiving antenna and/or a spare battery) (not shown) and/or a power charging cable 214$c'$ of FIGS. 3A and 3B (e.g., for electrodes 208$y'$ and 208$z'$)) for charging a charging integrated circuit ("IC") 208$a$ that may provide a node 208$a'$ with any suitable voltage (e.g., 4.2 Volts) for a battery 208$b$ (e.g., a lithium ion battery (e.g., Panasonic CG-320A 15 mAh battery)) with a battery protection IC 208$c$ and for a low-dropout ("LDO") regulator 208$d$ that can regulate a high output voltage at node 208$g$ (e.g., 3 Volts), which can be used by an LDO regulator 208$e$ that can regulate a low output voltage at node 208$f$ (e.g., 1.8 Volts). Power supply 208 may also be provided with a charge status display 212$a$ (e.g., one or more light-emitting diodes ("LEDs")) for presenting the charge status of battery 208$b$ to a user. Input component 210 may include one or more printed circuit(s) (e.g., a flexible printed circuit(s) and/or printed circuit board(s)) 210$z$ that may include any suitable number of sensors, including, but not limited to, a first sensor 210$a$ (e.g., an electrostatic switch (e.g., a touch key or any suitable electromechanical button)), a second sensor 210$b$ (e.g., an electrostatic switch), a third sensor 210$c$ (e.g., an electrostatic switch), and a fourth sensor 210$d$ (e.g., an electrostatic pad), that may be utilized with any suitable touch sensor circuitry 210$e$ (e.g., a projected capacitive touch and proximity trackpad/touchscreen controller implementation (e.g., on an IQS550 platform by Azoteq)) that may be supplied by the high output voltage of node 208$g$. Additionally or alternatively, input component 210 may include any suitable motion sensor circuitry 210$f$ (e.g., a 6-axis motion tracking device that may combine a 3-axis gyroscope and a 3-axis accelerometer in a small (e.g., 3 millimeter×3.0 millimeter×0.75 millimeter (e.g., 16-pin land grid array ("LGA")) package (e.g., an InvenSense ICM-20602)) that may be supplied by the high output voltage of node 208$g$. Additionally or alternatively, input component 210 may include any suitable auxiliary sensor circuitry 210$g$ (e.g., a miniature proximity sensor module (e.g., an ams TMD2635) and/or any suitable optical sensor (e.g., to detect presence of a finger wearing the input assembly, detect rotation of the input assembly about the wearing finger, detect translation of the input assembly along the wearing finger, etc.) and/or any suitable biometric sensor circuitry (e.g., user blood flow/blood pressure sensor and/or user body heat sensor and/or the like) that may detect any suitable characteristic(s) of the user wearing the assembly (e.g., any user generally wearing the assembly, unique identification of the specific user wearing the assembly, health of the user wearing the assembly, etc.)) that may be supplied by the high output voltage of node 208$g$ and/or by the low output voltage of node 208$f$, and/or the like. Communications component 206 may include any suitable communications system-on-chip ("SOC") 206a (e.g., the nRF52832 multiprotocol Bluetooth™ 5, ANT/ANT+ and 2.4 GHz proprietary SOC by Nordic Semiconductor), which may also provide at least a portion of processor 202 and/or memory 204 and/or application 203. Bus 214 may communicatively couple SOC 206a to circuitry 210e, circuitry 210f, circuitry 210g, the high output voltage of node 208g, an oscillator 206b (e.g., an XTAL2 (e.g., 32.768 KHz oscillator)), an oscillator 206c (e.g., an XTAL1 (e.g., 32.0 MHz oscillator)), any suitable low-pass filter ("LPF") 206d, and any suitable antenna 206e (e.g., a 2400-2483 MHz pattern antenna) that may communicate any suitable data 99.

FIGS. 2A-2E show an illustrative embodiment of input assembly 200 as may be worn by index finger IF of right hand RH of user U. As shown, input assembly 200 may be provided with a housing 201 defining a housing structure 201s with a shape of a cylinder or cylindrical tube (e.g., about and along an axis (e.g., a Y-axis)), including an external surface 201e and an internal surface 201i defining a hollow passageway 201p extending between a front open end 201fo and a rear open end 201ro, such that user U may insert the tip of index finger IF into hollow passageway 201p via front open end 201fo (e.g., in the +Y-direction) and may, potentially, insert index finger IF such that the tip of index finger IF may exit from passageway 201p via rear open end 201ro (e.g., as shown, such that the tip of index finger IF may be exposed for additional uses (e.g., touching a touch screen of device 100)). Alternatively, as described with respect to assembly 200'' of FIGS. 4A-4N, passageway 201p of structure 201s may only be open at front open end 201fo for enabling entry of a user finger into the passageway but may be closed at the opposite end. Various components of input assembly 200 (e.g., processor 202, memory 204, communications component 206, one or more input components 210, one or more output components 212, and/or the like) may be at least partially protected by housing structure 201s and/or at least partially positioned in a space within housing structure 201s (e.g., at least partially between external surface 201e and internal surface 201i) and/or at least coupled to one or both of surface 201i and/or surface 201e.

Any suitable portion(s) of housing 201 may provide one or more features for identifying to user U one or more input components for enabling functional interaction therewith by user U. For example, as shown, a first portion 201a of housing structure 201s (e.g., at external surface 201e), such as along a top portion of housing structure 201s, may provide any suitable features for identifying to user U the functional position of first sensor 210a (e.g., a first electrostatic switch) along or through the housing, a second portion 201b of housing structure 201s (e.g., at external surface 201e), such as along a right side portion of housing structure 201s, may provide any suitable features for identifying to user U the functional position of second sensor 210b (e.g., a second electrostatic switch) along or through the housing, a third portion 201c of housing structure 201s (e.g., at external surface 201e), such as along a left side portion of housing structure 201s (e.g., opposite second portion 201b (e.g., on opposite sides of passageway 201p)), may provide any suitable features for identifying to user U the functional position of third sensor 210c (e.g., a third electrostatic switch) along or through the housing, and/or a fourth portion 201d of housing structure 201s (e.g., at external surface 201e), such as along a bottom side portion of housing structure 201s (e.g., opposite first portion 201a (e.g., on opposite sides of passageway 201p) and adjacent second portion 201b and/or adjacent third portion 201c), may provide any suitable features for identifying to user U the functional position of fourth sensor 210d (e.g., an electrostatic pad) along or through the housing. Each one of such side portions of the housing may be configured to receive any suitable user input (e.g., a press, a hold, a swipe, a track pad gesture, etc.) that may be operative to be detected in any suitable manner by a respective sensor. In some embodiments, such a side portion of the housing may be operative to electrically (e.g., capacitively) couple a user's finger external to passageway 201p with a sensor of assembly 200. Alternatively, such a side portion of the housing may be an opening through the housing for enabling direct access to a sensor by a user's finger external to passageway 201p (e.g., a sensor electrode may provide a portion of the external surface of the assembly). In any event, a functional portion of a sensor may be made functionally available to a user's finger external to passageway 201p by a side portion of housing structure 201s (e.g., functionally positioned to detect a touch event by the user at that side portion).

Figure 2A:
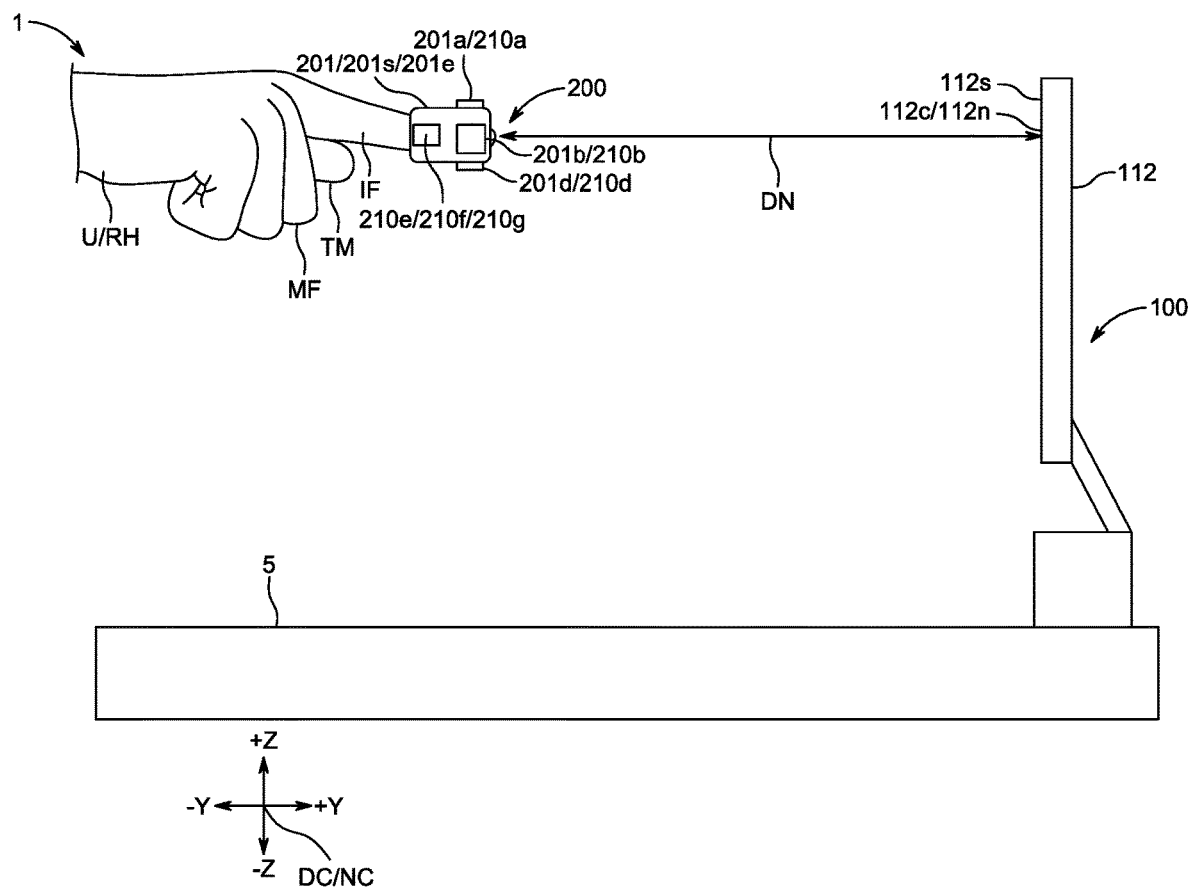
FIG. 2A is a right side view of an exemplary electronic input assembly interacting with an exemplary electronic device of the system of FIG. 1.
Figure 2B:
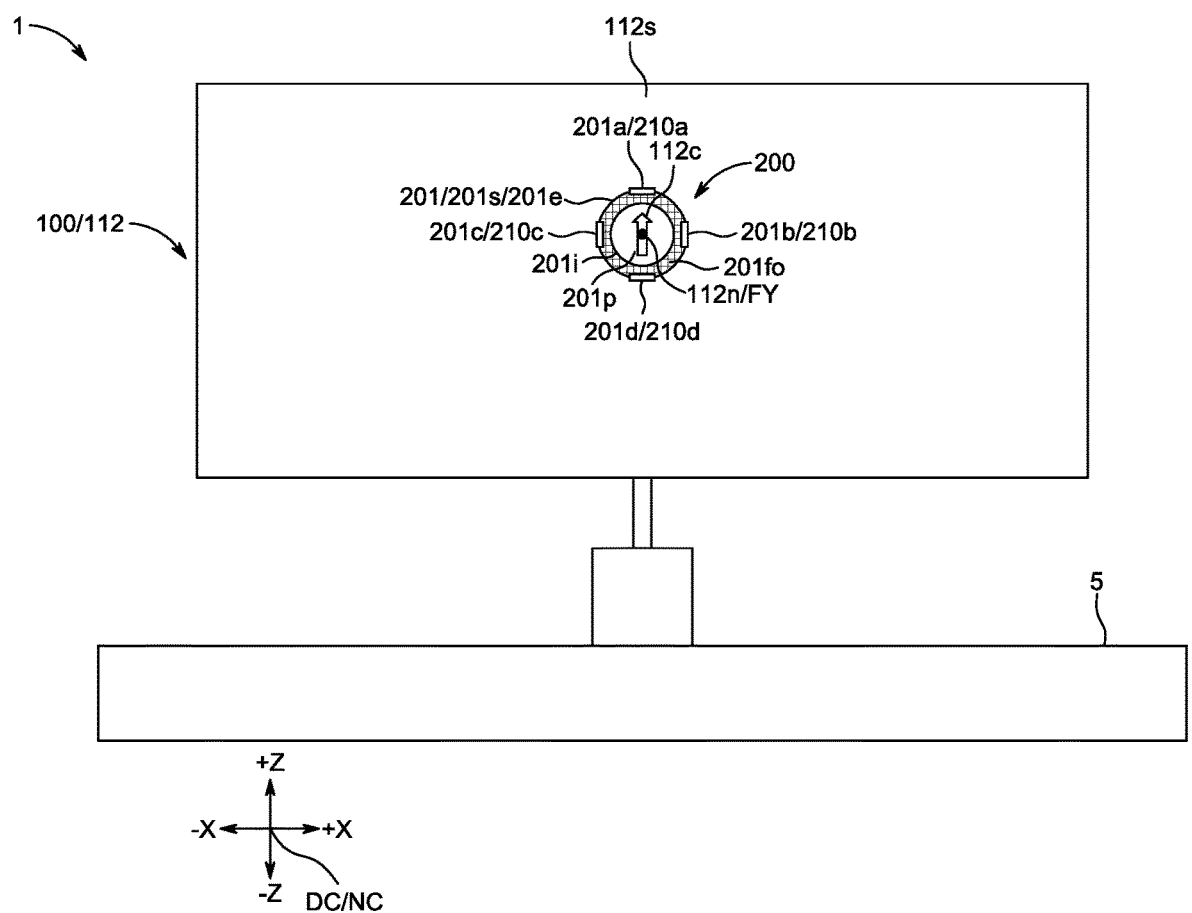
FIG. 2B is a front view of the system of FIGS. 1 and 2A.
Figure 2C:
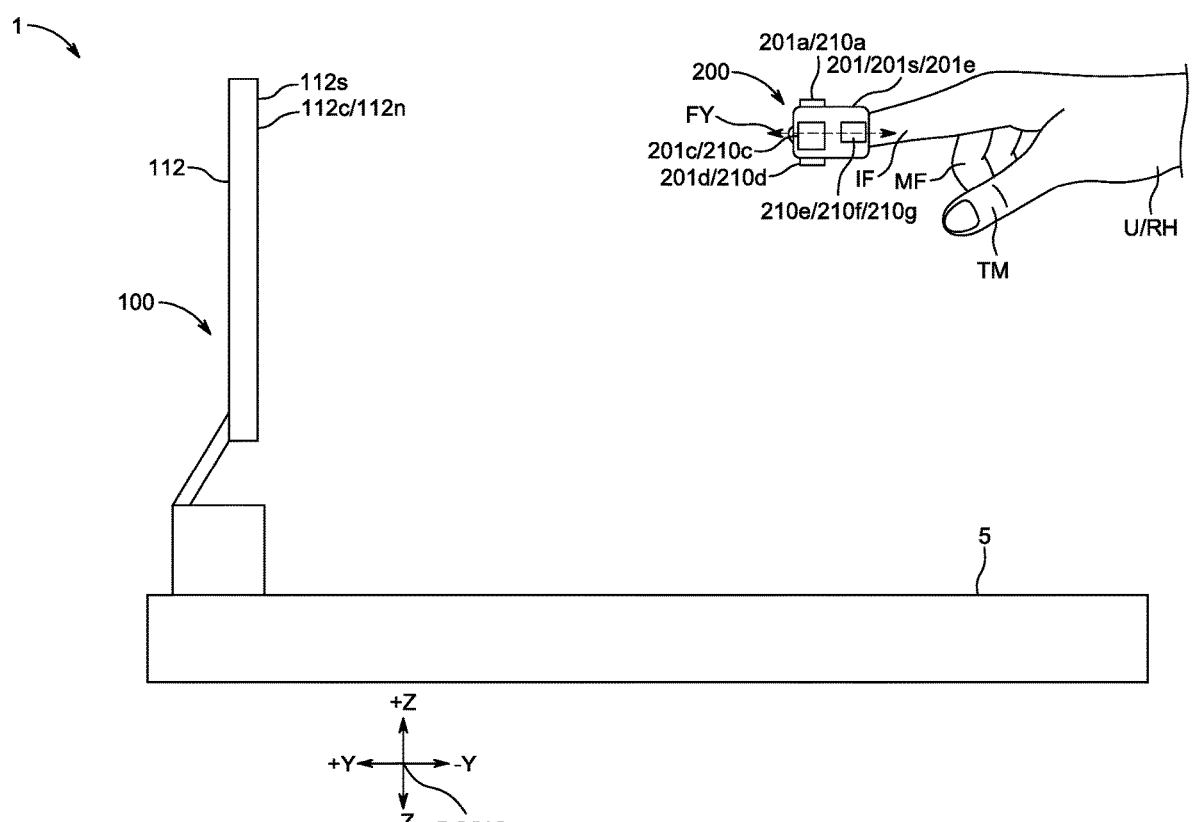
FIG. 2C is a left side view of the system of FIGS. 1, 2A, and 2B.
Figure 2D:
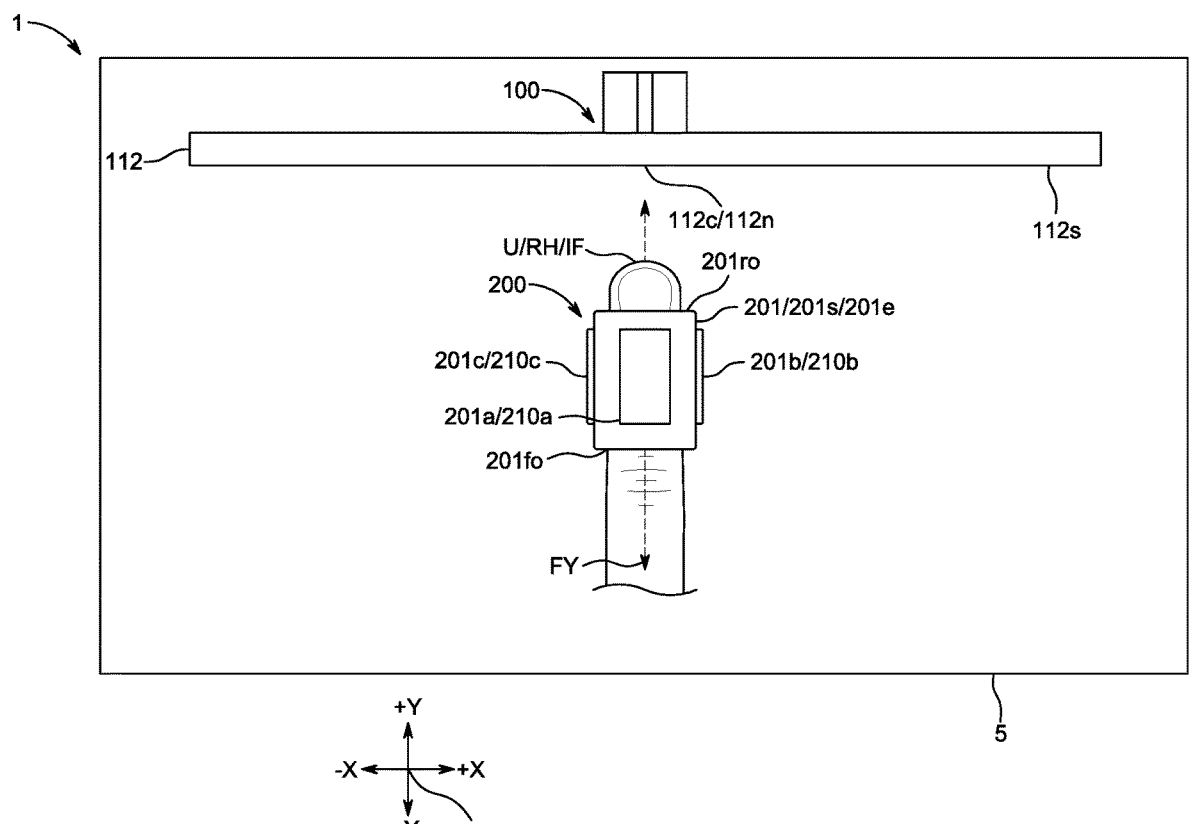
FIG. 2D is a top view of the system of FIGS. 1 and 2A-2C.
Figure 2E:
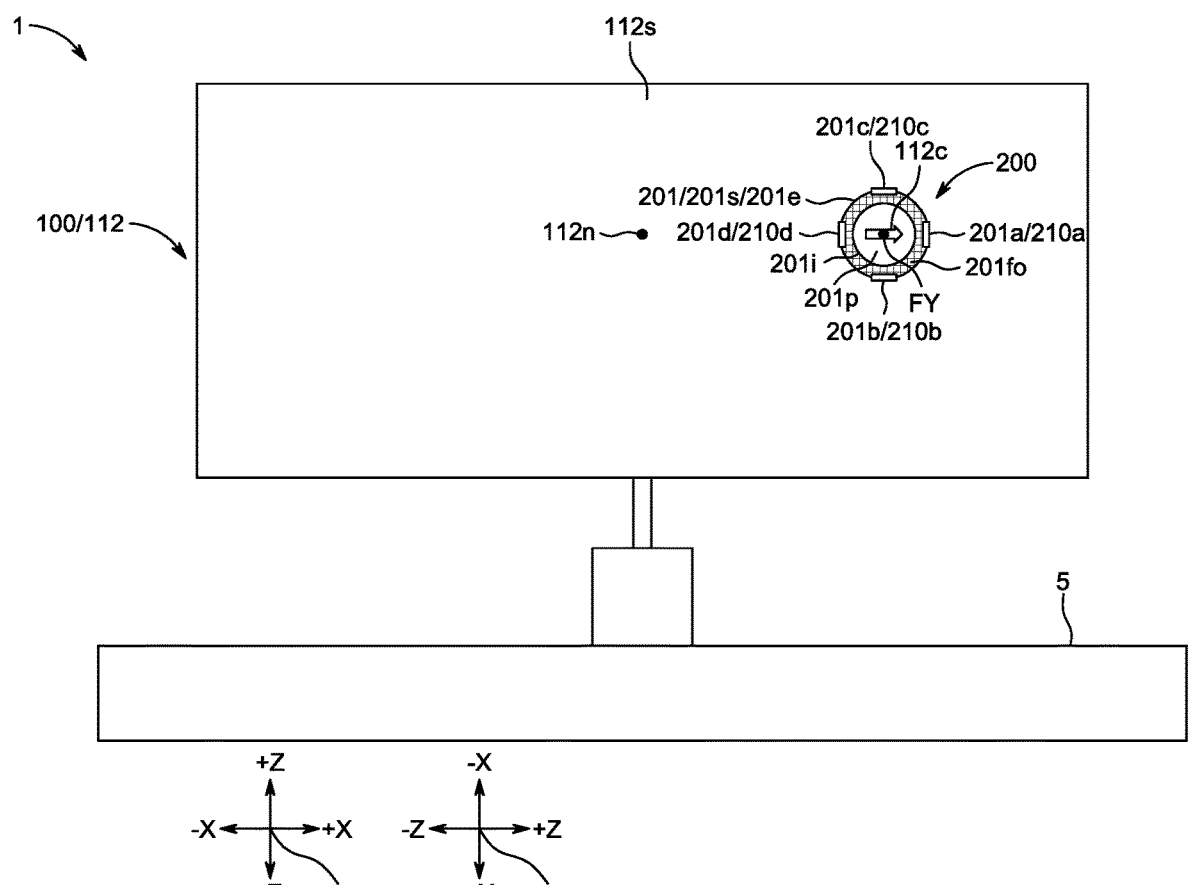
FIG. 2E is a front view of the system of FIGS. 1 and 2A-2D, but with the electronic input assembly moved with respect to the electronic device.

FIGS. 2A-2D depict input assembly 200 worn by index finger IF of user U above a work surface 5 with a particular orientation with respect to at least one portion of electronic device 100. As shown, electronic device 100 may include a display output component 112 with a planar display screen 112s with an outer surface that may exist in an X-Z plane of an X-Y-Z three-dimensional Cartesian coordinate system DC (device coordinate system DC), while work surface 5 may exist in an X-Y plane of device coordinate system DC (although any other suitable relationship between surface 5 and screen 112s may exist or surface 5 may not exist at all). System 1 may be configured such that electronic device 100 may be displaying at least an input assembly-controlled pointer or cursor 112c on display screen 112s that may be controlled by data 99 received from input assembly 200 based on user U interaction with input assembly 200. For example, any suitable component(s) of device 100 and any suitable component(s) of assembly 200 (e.g., image sensor(s) and array of lights for triangulation and/or any motion sensor circuitry and/or processors and/or applications and/or the like) may be operative to work together to determine a current placement of assembly 200 (e.g., of a coordinate system of assembly 200 (e.g., input coordinate system NC)) in three-dimensional space (e.g., current rotation and translation with respect to device coordinate system DC of device 100), which may be indicative of a distance DN of assembly 200 from a center 112n of display screen 112s, a translation of assembly 200 along each axis of device coordinate system DC from a center of display screen 112s, and/or a rotation of assembly 200 about each axis of device coordinate system DC. Such determination of a current placement of assembly 200 with respect to device 100 (e.g., a current distance and/or translation and/or rotation of assembly 200 with respect to device 100 or device coordinate system DC) may then be used to map particular user physical manipulations of input assembly 200 to particular types of control data 99 that may be communicated with device 100 for controlling device 100 (e.g., for controlling cursor 112c on screen 112s or for controlling any other suitable controllable feature(s) of the user interface of device 100). As shown, for example, the current placement of assembly 200 may be considered an origin or a position in which input coordinate system NC of assembly 200 may align with device coordinate system DC (e.g., a longitudinal axis Y of passageway 201p may be aligned with longitudinal axis Y of device coordinate system DC and a longitudinal axis Y of a user's finger wearing assembly 200 (e.g., axis FY of FIGS. 2B-2E) and may intersect center 112n of display screen 112s, while top first portion 201a and bottom fourth portion 201*d* of housing structure 201*s* may together define a normal axis Z of input coordinate system NC that may be aligned with appropriate respective portions of axis Z of device coordinate system DC, while right second portion 201*b* and left third portion 201*c* of housing structure 201*s* may together define a transverse axis X of input coordinate system NC that may be aligned with appropriate respective portions of axis X of device coordinate system DC. However, it is to be understood that any other suitable feature(s) and/or component(s) may be operative to define input coordinate system NC (e.g., any suitable axis/axes of any suitable sensing mechanism(s) of a sensor input component 210 of assembly 200 and/or of any suitable housing portions of a housing structure of housing 201 and/or the like). Device 100 and assembly 200 may be configured to determine any adjustment of such shown placement of assembly 200 and its input coordinate system NC with respect to device 100 and device coordinate system DC (e.g., any change in position of assembly 200 and its input coordinate system NC through translation thereof along axis Y of device coordinate system DC (e.g., surge (e.g., forwardly in the +Y-direction to reduce distance DN or rearwardly in the −Y-direction to increase distance DN)), any change in position of assembly 200 and its input coordinate system NC through translation thereof along axis Z of device coordinate system DC (e.g., heave (e.g., upwardly in the +Z-direction or downwardly in the −Z-direction)), any change in position of assembly 200 and its input coordinate system NC through translation thereof along axis X of device coordinate system DC (e.g., sway (e.g., rightwardly in the +X-direction or leftwardly in the −X-direction)), any change in orientation of assembly 200 and its input coordinate system NC through rotation thereof about axis Y of device coordinate system DC (e.g., roll (e.g., clockwise or counterclockwise about axis Y)), any change in orientation of assembly 200 and its input coordinate system NC through rotation thereof about axis Z of device coordinate system DC (e.g., yaw (e.g., clockwise or counterclockwise about axis Z)), and/or any change in orientation of assembly 200 and its input coordinate system NC through rotation thereof about axis X of device coordinate system DC (e.g., pitch (e.g., clockwise or counterclockwise about axis X))). For example, as shown in FIG. 2E, when assembly 200 and, thus, its input coordinate system NC are translated along axis X in the +X direction and rotated by 90° clockwise about axis Y (e.g., when user U rotates hand RH by 90° clockwise about axis Y and translates hand RH in the +X direction of device coordinate system DC), input coordinate system NC may be distinct from device coordinate system DC, and detection of such movement of assembly 200 (e.g., a translation of assembly 200 in the +X direction of device coordinate system DC and a rotation of assembly 200 by 90° clockwise about axis Y may then be used (e.g., by system 1 (e.g., by processor 102 and/or by processor 202)) to map such particular user physical manipulations of input assembly 200 to particular types of control data 99 that may be communicated with device 100 and/or generated by device 100 for controlling device 100 (e.g., for controlling cursor 112*c* on screen 112*s* (e.g., for respectively moving cursor 112*c* in the +X direction of device coordinate system DC and for rotating cursor 112*c* by 90° clockwise about axis Y (e.g., as shown in FIG. 2E)) and/or for controlling any other suitable controllable feature(s) of the user interface of device 100).

FIGS. 3A-3E show another illustrative embodiment of an input assembly 200' that may be worn by any suitable digit of any suitable hand of a user and that may include any suitable components similar to the components of assembly 200 and that may communicate with and control electronic device 100 similarly to assembly 200. However, unlike the substantially smooth cylindrical shape of external surface 201*e* of housing structure 201*s* of housing 201 of assembly 200 that may provide a substantially circular or, optionally oval, shaped cross-section (see, e.g., FIGS. 2B and 2E), input assembly 200' may be provided with a housing 201' defining a housing structure 201*s*' with a shape of a cube or any other suitable cuboid (e.g., a 29 millimeter by 29 millimeter by 32.5 millimeter cube along the X-, Y-, and Z-axes, respectively) or any other suitable polyhedron, including any suitable number of external side surfaces of external surface 201*e*' and at least one (e.g., cylindrical) internal side surface of internal surface 201*i*' defining a hollow passageway 201*p*' (e.g., with a 22 millimeter cross-sectional diameter) extending between a front open end 201*fo*' and a rear open end 201*ro*', such that user U may insert the tip of any digit into hollow passageway 201*p*' via front open end 201*fo*' (e.g., in the +Y-direction) and may, potentially, insert the digit such that the tip of the digit may exit from passageway 201*p*' via rear open end 201*ro*' (e.g., such that the tip of the digit may be exposed for additional uses (e.g., touching a touch screen of device 100)). Alternatively, as described with respect to assembly 200'' of FIGS. 4A-4N, passageway 201*p*' of structure 201*s*' may only be open at front open end 201*fo*' for enabling entry of a user digit into the passageway but may be closed at the opposite end (e.g., at the end of passageway 201*p* opposite end 201*fo*'). Various components of input assembly 200' (e.g., processor 202', memory 204', communications component 206', one or more input components 210', one or more output components 212', and/or the like) may be at least partially protected by housing structure 201*s*' and/or at least partially positioned in a space within housing structure 201*s*' (e.g., at least partially between external surface 201*e*' and internal surface 201*i*') and/or at least coupled to one or both of surface 201*i*' and/or surface 201*e*'.

Any suitable portion(s) of housing 201' may provide one or more features for identifying to the user one or more input components for enabling functional interaction therewith by the user. For example, as shown, a first portion 201*a*' of housing structure 201*s*' (e.g., at external surface 201*e*'), such as along a top portion of housing structure 201*s*', may provide any suitable features for identifying to user U the functional position of a first sensor 210*a*' (e.g., a first electrostatic switch), a second portion 201*b*' of housing structure 201*s*' (e.g., at external surface 201*e*'), such as along a right side portion of housing structure 201*s*', may provide any suitable features for identifying to user U the functional position of a second sensor 210*b*' (e.g., a second electrostatic switch), a third portion 201*c*' of housing structure 201*s*' (e.g., at external surface 201*e*'), such as along a left side portion of housing structure 201*s*' (e.g., opposite second portion 201*b*' (e.g., on opposite sides of passageway 201*p*')), may provide any suitable features for identifying to user U the functional position of a third sensor 210*c*' (e.g., a third electrostatic switch), and/or a fourth portion 201*d*' of housing structure 201*s*' (e.g., at external surface 201*e*'), such as along a bottom side portion of housing structure 201*s*' (e.g., opposite first portion 201*a*' (e.g., on opposite sides of passageway 201*p*') and adjacent second portion 201*b*' and/or adjacent third portion 201*c*'), may provide any suitable features for identifying to user U the functional position of a fourth sensor 210*d*' (e.g., an electrostatic pad).

Figures 3A, 3B:
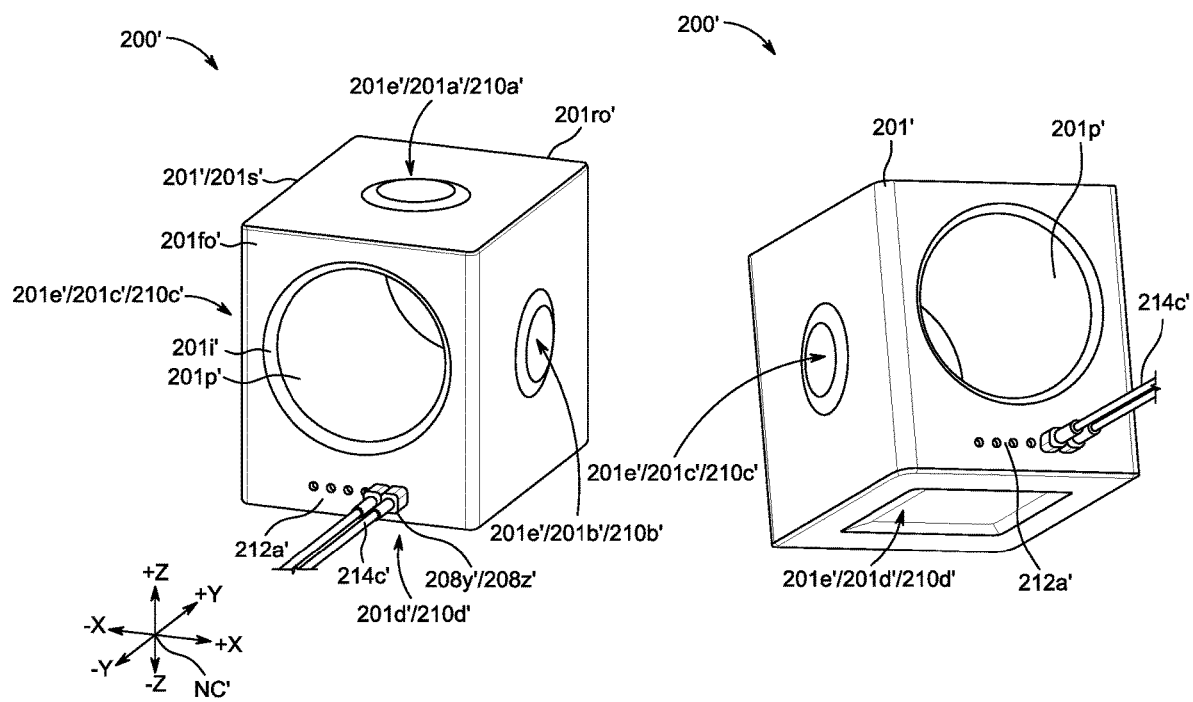
FIG. 3A is a top, front, right side perspective view of another exemplary input assembly.
FIG. 3B is a bottom, front, left side perspective view of the exemplary input assembly of FIG. 3A.
Figure 3C:
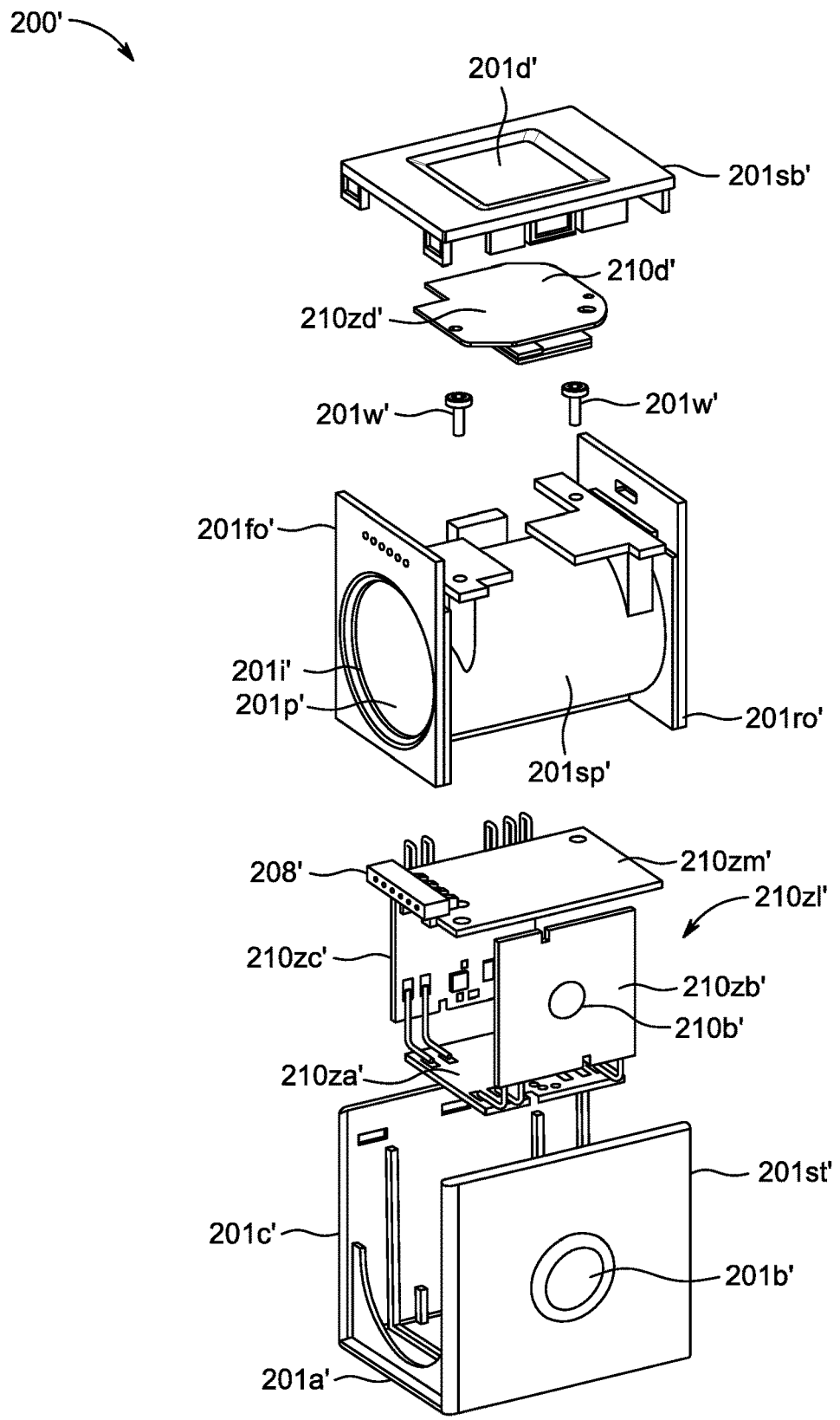
FIG. 3C is a bottom, rear, right side exploded perspective view of the exemplary input assembly of FIGS. 3A and 3B.
Figure 3D:
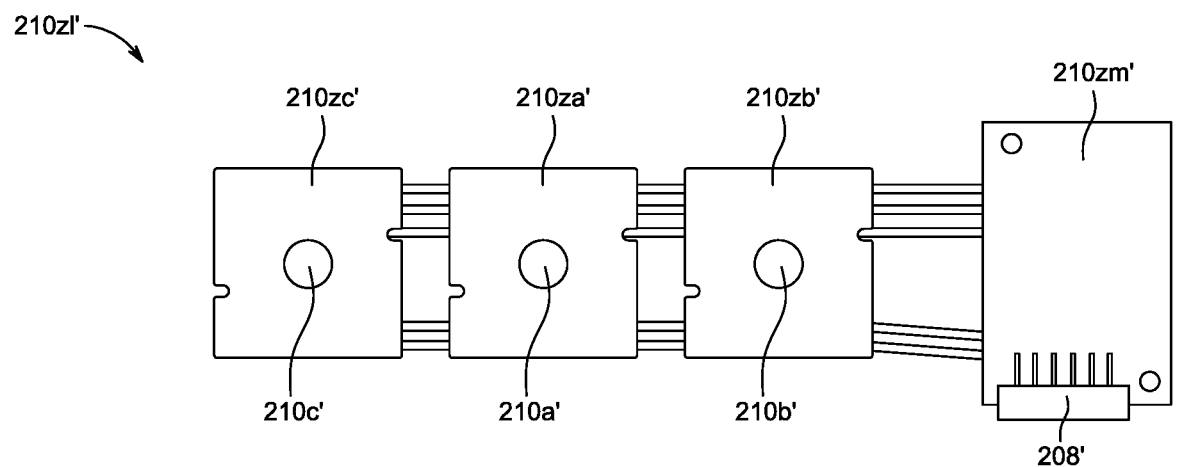
FIG. 3D is a flat view of an external side of a printed circuit assembly of the exemplary input assembly of FIGS. 3A-3C.
Figure 3E:
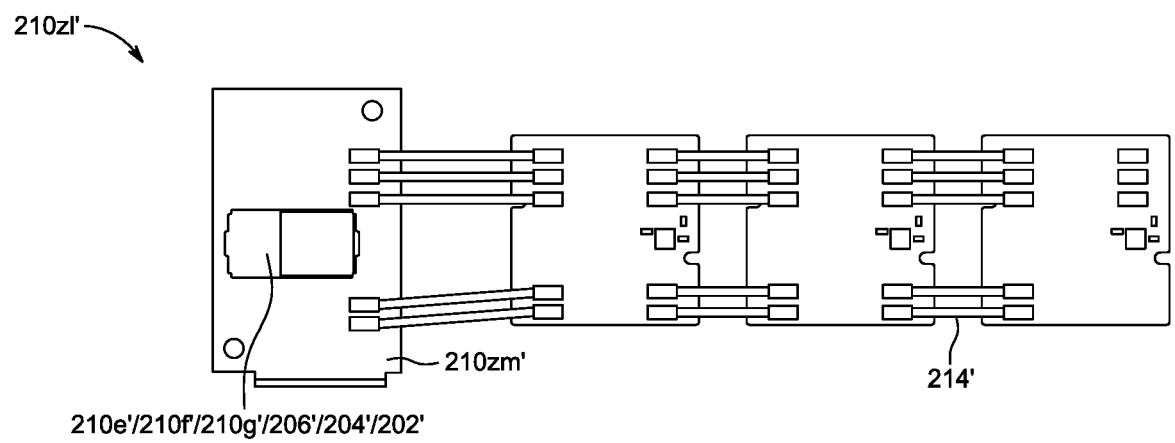
FIG. 3E is a flat view of an internal side of the printed circuit assembly of the exemplary input assembly of FIGS. 3A-3D.

As shown, housing structure 201*s*' may be provided by at least three different structures, including a top case 201*st*', a passageway case 201*sp*', and a bottom cover 201*sb*' that may be coupled together to form assembly 200'. As shown, top case 201st' may provide a three-sided empty case with top first portion 201a' and right second portion 201b' and left third portion 201c' of housing structure 201s', bottom cover 201sb' may provide bottom fourth portion 201d' of housing structure 201s', and passageway case 201sp' may provide internal surface 201i' and front open end 201fo' and rear open end 201ro' of housing structure 201s'. As shown, assembly 200' may also include a printed circuit board ("PCB") and/or flexible printed circuit ("FPC") assembly 210zl' that may include a main subassembly 210zm' and one or more side subassemblies, such as left side subassembly 210zc', top side subassembly 210za', and right side subassembly 210zb', where each subassembly of assembly 210zl' may include any suitable circuitry(ies) and/or component(s) provided thereon and may be electrically coupled to one another by any suitable bus(es) 214'. As shown in FIGS. 3C and 3D, an exterior side of left side subassembly 210zc' may include at least an electrode of sensor 210c' (e.g., an electrostatic switch), an exterior side of top side subassembly 210za' may include at least an electrode of sensor 210a' (e.g., an electrostatic switch), and an exterior side of right side subassembly 210zb' may include at least an electrode of sensor 210b' (e.g., an electrostatic switch), while an exterior side of main subassembly 210zm' may include at least a portion of battery 208'. Additionally, as shown in FIGS. 3C and 3E, an interior side of each one of left side subassembly 210zc', top side subassembly 210za', right side subassembly 210zb', and main subassembly 210zm' may include electrical contact(s) and bus(es) 214' for electrically coupling each subassembly, while an interior side of main subassembly 210zm' may also include at least a portion of touch sensor circuitry 210e', at least a portion of any motion sensor circuitry 210f, at least a portion of any auxiliary sensor circuitry 210g', at least a portion of any communications component 206', at least a portion of any memory 204', at least a portion of any processor 202', and/or the like.

Assembly 210zl' may be folded about (e.g., wrapped around) passageway case 201sp' (e.g., around passageway 201p'), such that, when assembly 210zl' and passageway case 201sp' are then positioned against top case 201st', an exterior side of one, some, or each of left side subassembly 210zc', top side subassembly 210za', and right side subassembly 210zb' may be coupled (e.g., held with double-sided tape or otherwise) to an interior side of a respective one of left portion 201c', top portion 201a', and right portion 201b' of housing structure 201s', and such that the electrode of sensor 210c' may functionally face left portion 201c' of housing structure 201s', such that the electrode of sensor 210a' may functionally face top portion 201a' of housing structure 201s', and such that the electrode of sensor 210b' may functionally face right portion 201b' of housing structure 201s'. Main subassembly 210zm' may be screwed or otherwise affixed to a bottom portion of passageway case 201sp' (e.g., using screws 201w'). Moreover, as shown, assembly 200' may also include a PCB and/or FPC bottom side subassembly 210zd', a bottom surface of which may include at least an electrode of sensor 210d' (e.g., an electrostatic pad), while a top surface of subassembly 210zd' may be electrically coupled to (e.g., mounted on) an exterior surface of main subassembly 210zm' below the bottom portion of passageway case 201sp'. Then, bottom cover 201sb' may be coupled to (e.g., snapped or otherwise affixed to) one or both of top case 201st' and passageway case 201sp' to form assembly 200', such that the electrode(s) of sensor 210d' may functionally face bottom portion 201d' of bottom cover 201sb' of housing structure 201s'. As shown, bottom portion 201d' of bottom cover 201sb' of housing structure 201s' may include an indented portion and/or be provided as an indentation and/or projection in order for a user (e.g., a tip of a user's thumb TM while the user's index finger is wearing assembly 200') to identify the bounds of bottom portion 201d' and its associated fourth sensor 210d' (e.g. a trackpad) through feel (e.g., without looking at assembly 200'). One, some, or each one of portions 201a', 201b', and/or 201c' may also be at least partially provided as an indentation and/or as a projection in order for a user (e.g., one or more portions of one or more user's digits not wearing assembly 200') to identify the bounds of such housing input portion(s) through feel (e.g., without looking at assembly 200').

FIGS. 4A-4N show yet another illustrative embodiment of an input assembly 200" that may be worn by any suitable digit of any suitable hand of a user and that may include any suitable components similar to the components of assembly 200 and/or of assembly 200' and that may communicate with and control electronic device 100 similarly to assembly 200 and/or assembly 200'. However, unlike the open ended shape of housing structure 201s' of housing 201' of assembly 200', input assembly 200" may be provided with a housing 201" defining a housing structure 201s" with a closed ended shape that may be similar to that of an end of a user's digit, which may include any suitable number of external sides of external surface 201e" and at least one internal side surface of internal surface 201i" defining a hollow (e.g., cylindrical) passageway 201p" extending between a front open end 201fo" and a rear closed end 201ro" (e.g., a closed end with a first flat portion (e.g., extending along an X-Z plane) and a second flat portion extending at an angle therefrom or any suitable curved portion such that the closed end may mimic the shape of a fingertip of a user's digit), such that user U may insert the tip of any digit into hollow passageway 201p" via the opening in front open end 201fo" (e.g., in the +Y-direction (e.g., in the direction of arrow I of FIG. 4N)) for wearing assembly 200" on that digit. Various components of input assembly 200" (e.g., processor 202", memory 204", communications component 206", one or more input components 210", one or more output components 212", and/or the like) may be at least partially protected by housing structure 201s" and/or at least partially positioned in a space within housing structure 201s" (e.g., at least partially between external surface 201e" and internal surface 201i") and/or at least coupled to one or both of surface 201i" and/or surface 201e".

Any suitable portion(s) of housing 201" may provide one or more features for identifying to the user one or more input components for enabling functional interaction therewith by the user. For example, as shown, a first portion 201a" of housing structure 201s" (e.g., at external surface 201e"), such as along a top portion of housing structure 201s", may provide any suitable features for identifying to user U the functional position of a first sensor 210a" (e.g., a first electrostatic switch), a second portion 201b" of housing structure 201s" (e.g., at external surface 201e"), such as along a right side portion of housing structure 201s", may provide any suitable features for identifying to user U the functional position of a second sensor 210b" (e.g., a second electrostatic switch), a third portion 201c" of housing structure 201s" (e.g., at external surface 201e"), such as along a left side portion of housing structure 201s" (e.g., opposite second portion 201b" (e.g., on opposite sides of passageway 201p")), may provide any suitable features for identifying to user U the functional position of a third sensor 210c" (e.g., a third electrostatic switch), and/or a fourth portion 201d" of housing structure 201s''' (e.g., at external surface 201e'''), such as along a bottom side portion of housing structure 201s''' (e.g., opposite first portion 201a''' (e.g., on opposite sides of passageway 201p''') and adjacent second portion 201b''' and/or adjacent third portion 201c'''), may provide any suitable features for identifying to user U the functional position of a fourth sensor 210d''' (e.g., an electrostatic pad).

Figure 4I:
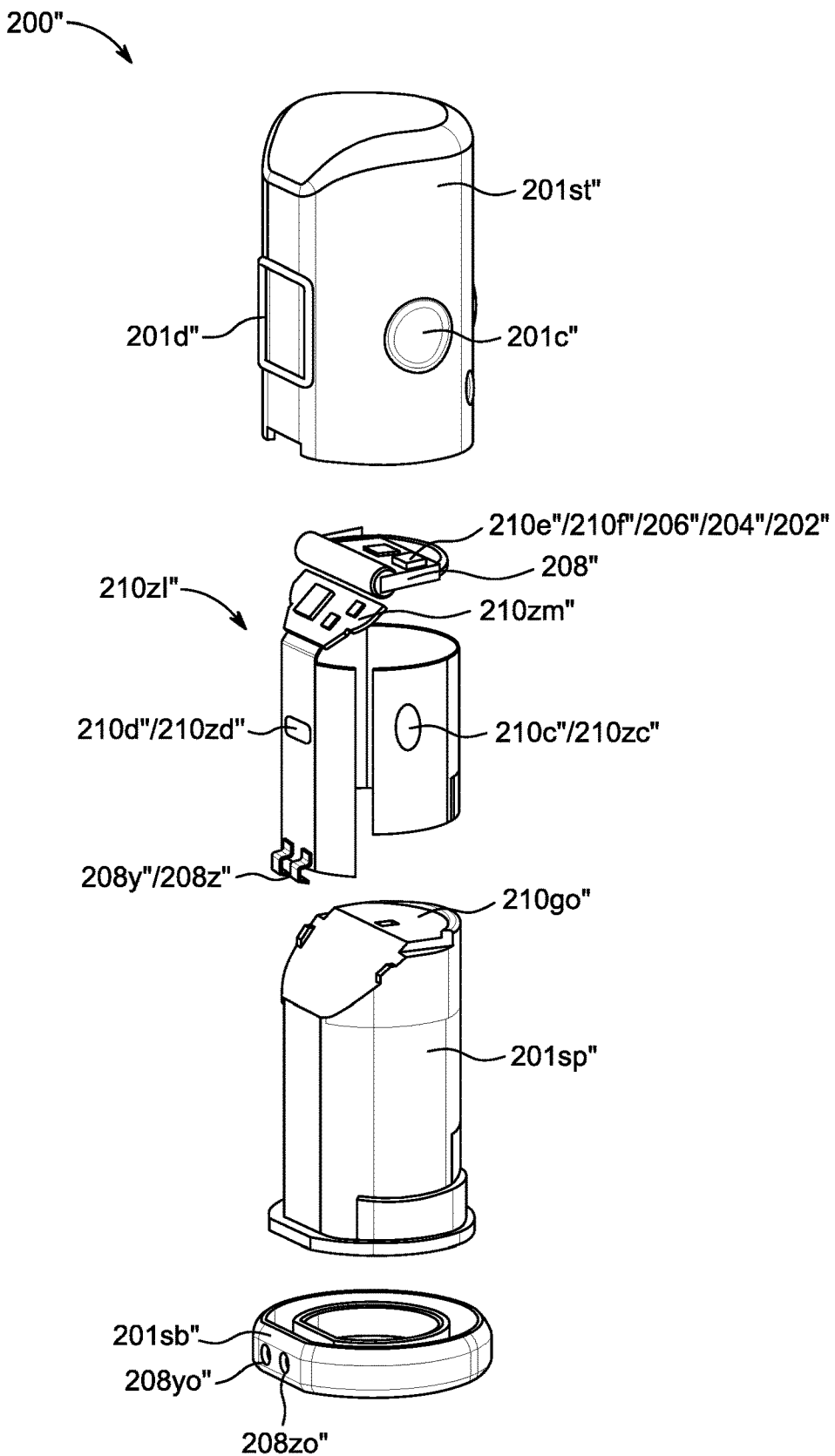
FIG. 4I is a bottom, rear, left side exploded perspective view of the exemplary input assembly of FIGS. 4A-4H.
Figure 4J:
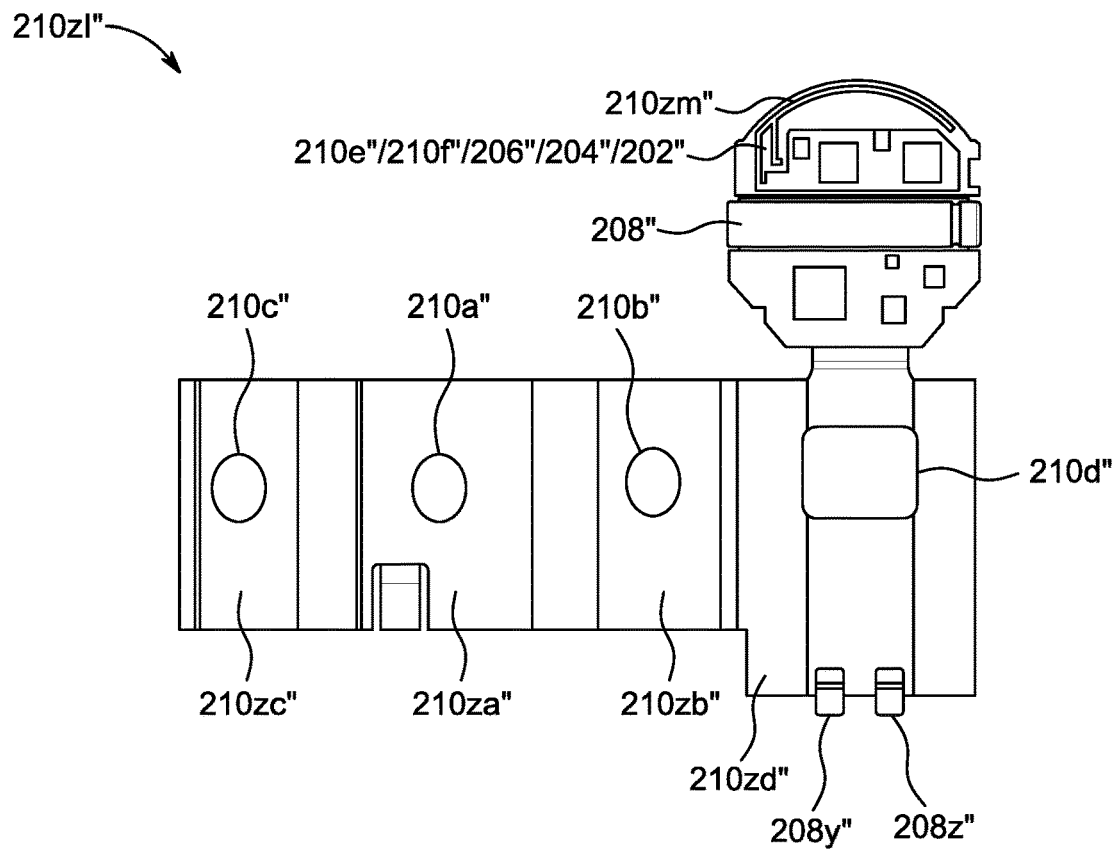
FIG. 4J is a flat view of an external side of a printed circuit assembly of the exemplary input assembly of FIGS. 4A-4I.
Figure 4K:
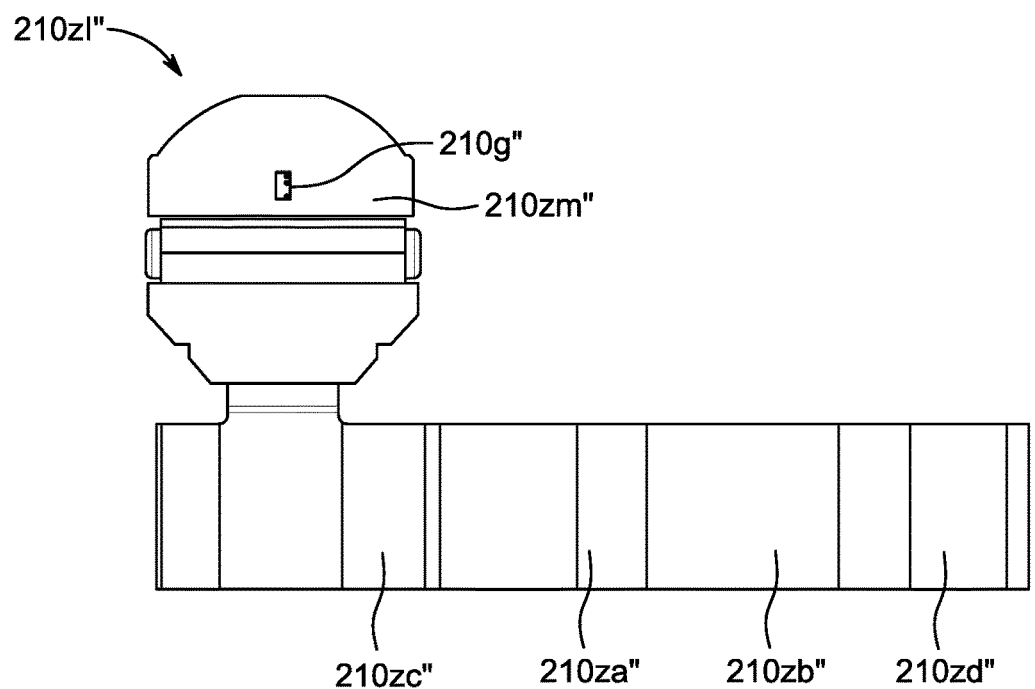
FIG. 4K is a flat view of an internal side of the printed circuit assembly of the exemplary input assembly of FIGS. 4A-4J.

As shown, housing structure 201s''' may be provided by at least three different structures, including a rear case 201st''', a passageway case 201sp''', and a front cover 201sb''' that may be coupled together to form assembly 200'''. As shown, rear case 201st''' may provide a hollow outer casing with top first portion 201a''' and right second portion 201b''' and left third portion 201c''' and bottom fourth portion 201d''' of housing structure 201s''' and a closed end rear portion of external surface 201e''' of housing structure 201s''', front cover 201sb''' may provide front open end 201fo''' of housing structure 201s''' with an opening providing access to passageway 201p''', and passageway case 201sp''' may provide front open end 201fo''' (e.g., if no front cover 201sb''') and internal surface 201i''' (e.g., for defining at least a portion or all of passageway 201p''') and rear closed end 201ro''' of housing structure 201s' through which a rear closed end opening 210go''' may be provided for enabling functional access to passageway 201p''' by any suitable sensor circuitry external thereto (e.g., auxiliary sensor circuitry 210g''' (see, e.g., FIGS. 4I, 4K, 4M, and 4N)). As shown, assembly 200''' may also include a printed circuit board ("PCB") and/or flexible printed circuit ("FPC") assembly 210zl''' that may include a main subassembly 210zm''' and one or more side subassemblies, such as left side subassembly 210zc''', top side subassembly 210za''', right side subassembly 210zb''', and bottom side subassembly 210zd''', where each subassembly of assembly 210zl''' may include any suitable circuitry(ies) and/or component(s) provided thereon and may be electrically coupled to one another by any suitable bus(es) or any other suitable type of electrical coupling(s). As shown in FIGS. 4I and 4J, an exterior side of left side subassembly 210zc''' may include at least an electrode of sensor 210c''' (e.g., an electrostatic switch), an exterior side of top side subassembly 210za''' may include at least an electrode of sensor 210a''' (e.g., an electrostatic switch), an exterior side of right side subassembly 210zb''' may include at least an electrode of sensor 210b''' (e.g., an electrostatic switch) and an exterior side of bottom side subassembly 210zd''' may include at least electrode(s) of sensor 210d''' (e.g., an electrostatic pad), while an exterior side of main subassembly 210zm''' may include at least a portion of battery 208''', at least a portion of touch sensor circuitry 210e''', at least a portion of any motion sensor circuitry 210f, at least a portion of any communications component 206''', at least a portion of any memory 204''', at least a portion of any processor 202''', and/or the like. Additionally, as shown in FIGS. 4K and 4N, an interior side of main subassembly 210zm''' may include at least a portion of any auxiliary sensor circuitry 210g''' and/or the like.

Assembly 210zl''' may be folded about (e.g., wrapped around) passageway case 201sp''' (e.g., around and about passageway 201p'''), such that, when assembly 210zl''' and passageway case 201sp''' are then positioned within the hollow of rear case 201st''', an exterior side of one, some, or each of left side subassembly 210zc''', top side subassembly 210za''', right side subassembly 210zb''', and bottom side assembly 210zd''' may be coupled to (e.g., held with double-sided tape or otherwise held functionally proximate or against) an interior side of a respective one of left portion 201c''', top portion 201a''', right portion 201b''', and bottom portion 201d''' of housing structure 201s''', and such that the electrode of sensor 210c''' may functionally face left portion 201c''' of housing structure 201s''', such that the electrode of sensor 210a''' may functionally face top portion 201a''' of housing structure 201s''', such that the electrode of sensor 210b''' may functionally face right portion 201b''' of housing structure 201s''', and such that the electrode of sensor 210d''' may functionally face bottom portion 201d''' of housing structure 201s'''. As shown, bottom portion 201d''' of rear case 201st''' of housing structure 201s''' may include an indented portion and/or be provided as an indentation and/or projection of any suitable size (e.g., height and/or depth TPM) in order for a user (e.g., a tip of a user's thumb TM while the user's index finger is wearing assembly 200''') to identify the bounds of bottom portion 201d''' and its associated fourth sensor 210d''' (e.g. a trackpad) through feel (e.g., without looking at assembly 200'). For example, a projection or indentation of bottom portion 201d''' for identifying a functional surface for operating fourth sensor 210d''' may have any suitable height and/or depth TPM, such as between 9 millimeters and 13 millimeters or about 11 millimeters (e.g., an 11 mm by 11 mm trackpad with position grid resolution 96×96 or 30×30). One, some, or each one of portions 201a''', 201b''', and/or 201c''' may also be at least partially provided as an indentation and/or as a projection in order for a user (e.g., one or more portions of one or more user's digits not wearing assembly 200''') to identify the bounds of such housing input portion(s) through feel (e.g., without looking at assembly 200'''). For example, a projection or indentation of left portion 201c''' for identifying a functional surface for operating sensor 210c''' may have any suitable height and/or depth or diameter RD, such as between 5 millimeters and 8 millimeters or about 6.5 millimeters (e.g., a 6.5 mm diameter touch sensor (e.g., single Key capacitive touch microchip at42qt1011 with sense electrode)).

Moreover, when assembly 210zl''' may be folded about (e.g., wrapped around) passageway case 201sp''', at least a portion of auxiliary sensor circuitry 210g''' may align with rear closed end opening 210go''' through rear closed end 201ro''' of passageway case 201sp''' for enabling or at least improving the functionality of auxiliary sensor circuitry 210g''' (e.g., the functionality to detect any suitable characteristic(s) of a user's digit that may be positioned within passageway 201p''' of passageway case 201sp''' (e.g., to detect the presence of a user's digit wearing assembly 200''' and/or to detect rotation of the input assembly about the user's wearing digit and/or to detect translation of the input assembly along the user's wearing digit)). Front cover 201sb''' may be coupled to (e.g., snapped or otherwise affixed to) one or some or each of rear case 201st''' and passageway case 201sp''' and assembly 210zl''' (e.g., as positioned between rear case 201st''' and passageway case 201sp''') to form assembly 200''' (e.g., to hold rear case 201st''' and passageway case 201sp''' and assembly 210zl''' in the appropriate functional positions with respect to one another and/or to safely protect yet enable access to electrodes 208y''' and 208z''' of assembly 210zl''' via structure 201s''' (e.g., via openings 208yo''' and 208zo''' through front cover 201sb'''). At least a portion of front cover 201sb''' may be provided by any suitable material, such as a rubber or foam cushion, that may be operative to interface comfortably with (e.g., about a periphery of) a user's digit that may be wearing assembly 200''' while forming an interference fit with the user's digit (e.g., to comfortably prevent assembly 200''' from inadvertently slipping off of the user's digit). At least a portion of rear case 201st''' and/or at least a portion of passageway case 201sp''' may be provided by any suitable material with appropriate rigidity, including, but not limited to, polycarbonate and/or acrylonitrile butadiene styrene and/or any other thermoplastic. Alternatively, in some embodiments, a majority or at least a substantial portion of housing 201" or housing 201' or housing 201 may be provided by any suitable material, such as a rubber or elastic material or expandable and contractible structure that may be operative to interface comfortably with (e.g., about a periphery of) a user's digit that may be wearing the input assembly while operative to form an interference fit with the user's digit wearing the input assembly (e.g., to comfortably prevent the assembly from inadvertently slipping off of the user's digit).

As shown in FIG. 4D, assembly 200" may have any suitable height HH, such as between 40 millimeters and 46 millimeters or about 43.05 millimeters. As shown in FIG. 4G, rear case 201st" may have any suitable depth RCD, such as between 25 millimeters and 35 millimeters or about 29.8 millimeters, and any suitable width RCW, such as between 20 millimeters and 30 millimeters or about 26.768 millimeters. As shown in FIG. 4D, front cover 201sb" may have any suitable height FCH, such as between 25 millimeters and 35 millimeters or about 29.8 millimeters, and any suitable width RCW, such as between 4 millimeters and 8 millimeters or about 6.3 millimeters. As shown in FIG. 4H, passageway 201p" may have any suitable depth PD, such as between 14 millimeters and 20 millimeters or about 17.4 millimeters, and any suitable width PW, such as between 11 millimeters and 17 millimeters or about 14.4 millimeters.

Figure 5:
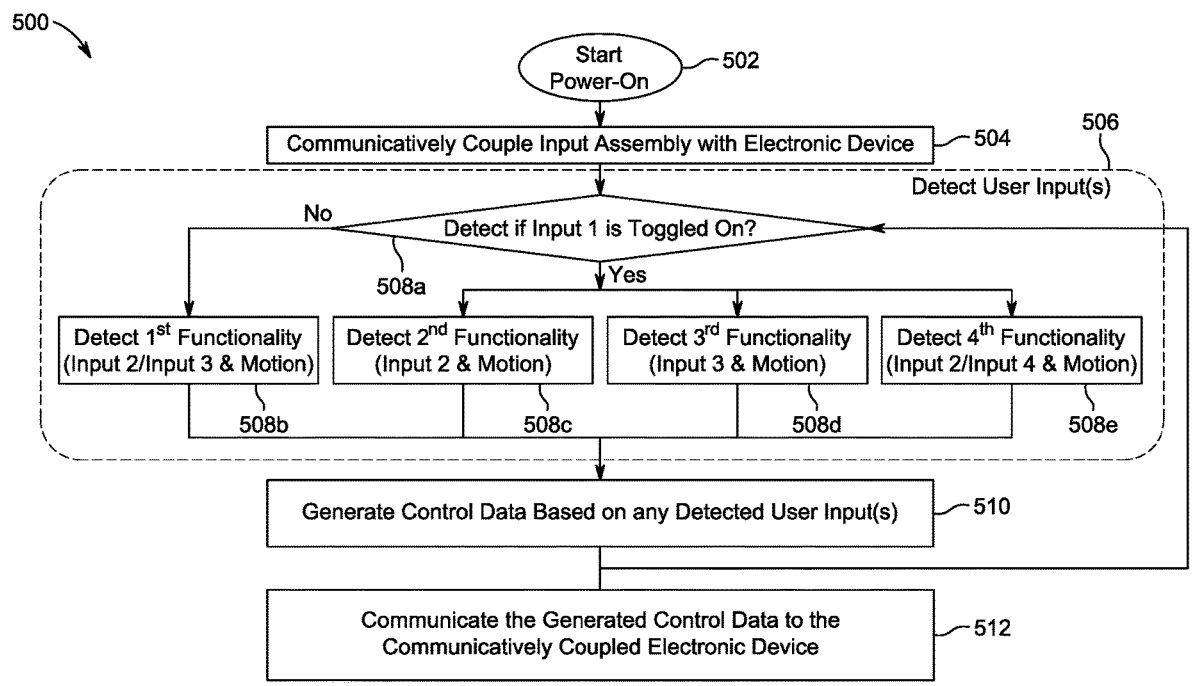
FIGS. 5 and 6 are flowcharts of illustrative processes for using an input assembly to control an electronic device.

FIG. 5 is a flowchart of an illustrative process 500 for using an input assembly for controlling an electronic device, such as for using input assembly 200, 200', or 200" for controlling electronic device 100. At operation 502, process 500 may start when the input assembly is powered-on, which may be accomplished in any suitable manner (e.g., by a user pressing any one or any combination of input components for any suitable period of time). Next, at operation 504, process 500 may attempt to communicatively couple the input assembly with the electronic device. Such an operation 504 may be carried out in any suitable manner, such as through a process 600 of FIG. 6.

Figure 6:
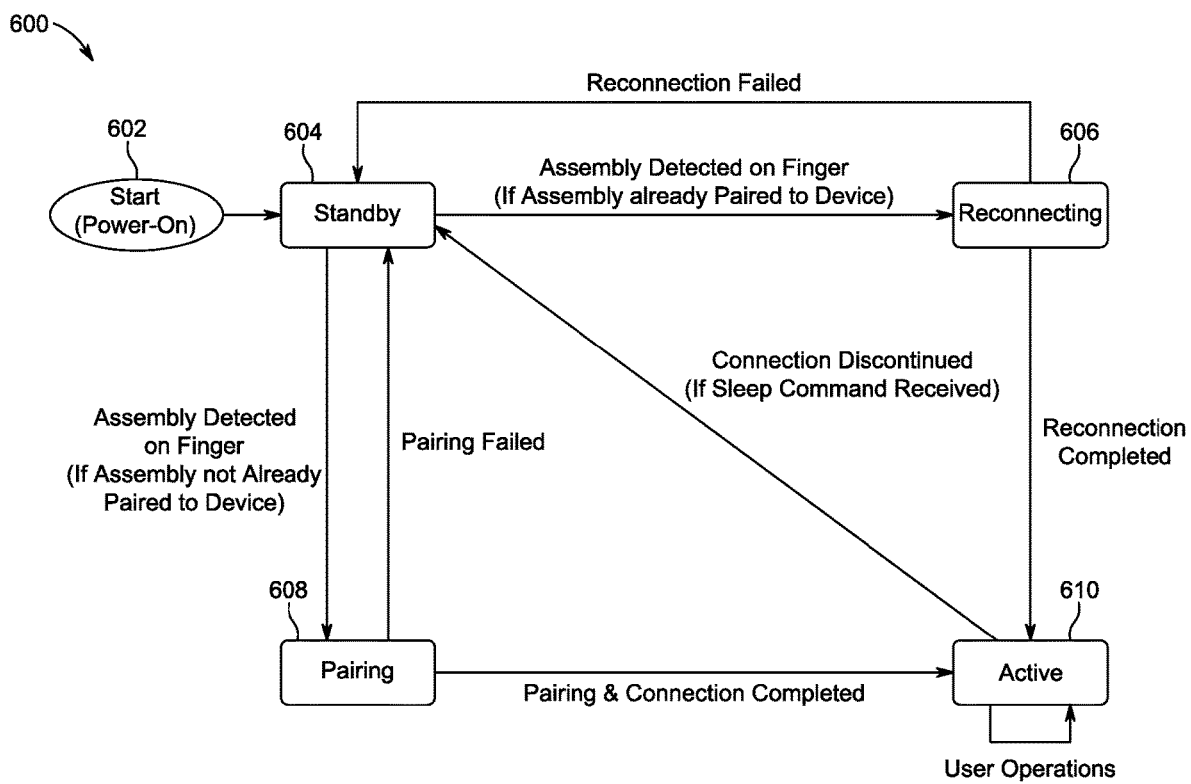

FIG. 6 is a flowchart of an illustrative process 600 determining a particular state of an input assembly operative to be communicative coupled to an electronic device, such as input assembly 200, 200', or 200" with respect to electronic device 100. At operation 602, process 600 may start when the input assembly is powered-on (e.g., as described with respect to operation 502 of process 500). Next, at operation 604, the input assembly may be operated in any suitable standby mode (e.g., a mode in which some but not all components of the input assembly may be powered (e.g., a mode in which a communications component and processor and auxiliary sensor circuitry may be powered for operation but in which motion sensor circuitry and one or more other input components and/or output components may be disabled (e.g., for saving power resources)). When in such a standby mode, the input assembly may be configured to determine if the input assembly ought to be communicatively coupled to the electronic device. In some embodiments, any suitable sensing capabilities of the input assembly may be used to make such a determination. For example, any suitable auxiliary sensor circuitry (e.g., auxiliary sensor circuitry 210g") may be used to determine whether or not the input assembly is currently being worn on a user's finger (e.g., an optical proximity sensor may be used to determine if a user's finger is properly positioned within a hollow passageway of the input assembly). If it is determined at operation 604 that the input assembly is currently being worn on a user's finger, then process 600 may advance to either operation 606 or operation 608 depending on whether the input assembly has already previously been paired with the electronic device. For example, when process 600 is attempting to communicatively couple an input assembly to an electronic device using any suitable Bluetooth communications components (e.g., components 206" and 106), the input assembly may also be operative to determine at operation 604 whether such components have been previously paired with one another. If it is determined at operation 604 that the input assembly has not yet been paired with the electronic device but is ready to be, process 600 may advance from operation 604 to operation 608, at which process 600 may attempt to pair and connect the input assembly and device. If unsuccessful, process 600 may return from operation 608 to operation 604. If successful, process 600 may advance from operation 608 to operation 610, at which the input assembly may be operated in any suitable active mode (e.g., a mode in which additional components of the input assembly may be powered (e.g., a mode in which motion sensor circuitry and/or one or more additional input components may be powered for detecting any suitable user operations (see, e.g., operation 506 of process 500))). However, if it is determined at operation 604 that the input assembly has already been paired with the electronic device and is ready to be reconnected, process 600 may advance from operation 604 to operation 606, at which process 600 may attempt to reconnect the input assembly and device. If unsuccessful, process 600 may return from operation 606 to operation 604. If successful, process 600 may advance from operation 606 to operation 610, at which the input assembly may be operated in any suitable active mode. When in such an active mode, the input assembly may be configured to detect any suitable user operations and may remain in such an active mode until the input assembly is powered off or until it is determined at operation 610 that the connection is to be discontinued (e.g., by receiving a sleep command), in which case process 600 may advance from operation 610 to operation 604. A determination may be made to discontinue a connection with the electronic device when the input assembly receives any suitable sleep command, which may occur in response to the input assembly determining that the input assembly has not been moved for more than a threshold period of time, or in response to the input assembly determining that the input assembly is no longer being worn by a user's finger (e.g., through use of any suitable auxiliary sensor circuitry). It is understood that the operations shown in process 600 of FIG. 6 are only illustrative and that existing operations may be modified or omitted, additional operations may be added, and the order of certain operations may be altered.

Returning now to FIG. 5, once the input assembly has been communicatively coupled to the electronic device at operation 504, process 500 may proceed to operation 506, at which any suitable user operations may be detected. At operation 506, any user input may be detected by any input component of the input assembly or any combination of user inputs may be detected by any combination of input components of the input assembly (e.g., any input(s) provided by a user wearing the input assembly as may be detected by any input component(s) 210 or 210' or 210" of the input assembly), and such detected user input(s) may then be processed by any suitable processor(s) and any suitable application(s) of the input assembly for generating any suitable control data based on the detected user input(s) at operation 510. Then, process 500 may proceed not only to operation 512 for communicating (e.g., after any appropriate buffering) the control data generated at operation 510 to the communicatively coupled electronic device (e.g., as control data 99 to electronic device 100) but also process 500 may return to operation 506 for detecting any new user input(s).

An input assembly may include any suitable number of input components arranged in any suitable manner with respect to any suitable housing structure that may be worn in any suitable manner on any suitable digit of any suitable hand of a user. For example, as shown herein, an input assembly may provide multiple distinct input components (e.g., input components 210a-210d, 210a'-210d', 210a"-210d", etc.) with functional interfaces disposed about a periphery of a user's finger (e.g., about a longitudinal axis FY of the user's finger) when the finger is wearing the input assembly, where each input component may be independently operative to detect an input provided by the user (e.g., by one or more user fingers other than the finger wearing the input assembly). Additionally, the input assembly may include one or more additional input components (e.g., input components 210f and/or 210g) that may be positioned in any suitable manner with respect to the user's finger operative to detect other user input(s) (e.g., movement of the input assembly within three-dimensional space and/or presence or biometric characteristic(s) of the user's finger within a passageway of the input assembly being worn by that user's finger and/or rotation and/or translation of the input assembly with respect to the wearing finger) and the system may use such detected inputs to control a user interface of the electronic device in any suitable manner. As just one illustrative example of the many possible ways in which system 1 may be configured to detect user input(s) at an input assembly for generating control data for a communicatively coupled electronic device, particular suboperations 508a-508e of operation 506 of process 500 may be provided.

For example, a first one of the input components may be configured to be used as a toggle for toggling between one of two or modes, where, at operation 508a, it may be determined whether a first input component (e.g., a top input component 210a, 210a', 210a", etc.) has been touched once or any odd number of times (e.g., such that it has toggled on) or whether the first input component has been touched no times or any even number of times (e.g., such that it is toggled off). If it is determined that the first input component is toggled off, then operation 506 may advance from suboperation 508a to suboperation 508b, at which only a first functionality type of the input assembly may be detected. However, if it is determined that the first input component is toggled on, then operation 506 may advance from suboperation 508a to any one of suboperations 508c-508e, at which a respective one of a second or third or fourth functionality type of the input assembly may be detected. Each of the four functionality types may involve a different set of possible user inputs to be detected, where each functionality type, when detected, may be operative to be processed to generate a different type of control data for controlling the electronic device in a different manner. For example, the first functionality type may include a default functionality type when the first input is toggled off, which may include being operative to generate a mouse cursor type of control data (e.g., for controlling cursor 112c on screen 112s in a first manner as if the input assembly were a common mouse input component), where, for example, motion sensor circuitry of the input assembly may be operative to detect any movement of the input assembly in three-dimensional space (e.g., direction, acceleration, deceleration, etc.), as may occur when a user moves in space its finger wearing the input assembly, while a second one of the input components (e.g., a right input component 210b, 210b', 210b", etc.) may be operative to detect any tap event or any hold event as may occur when a user interacts with that input component using a finger different than the finger wearing the input assembly (e.g., a right hand middle finger MF when a right hand index finger IF is wearing the input assembly) and/or while a third one of the input components (e.g., a left input component 210c, 210c', 210c", etc.) may be operative to detect any tap event or any hold event as may occur when a user interacts with that input component using another finger different than the finger wearing the input assembly (e.g., a right hand thumb TM when a right hand index finger IF is wearing the input assembly). The system (e.g., the processor of the input assembly and/or the processor of the electronic device (e.g., in combination with any application(s) running thereon)) may be configured to generate and/or receive control data operative to control a cursor or other instrument of a user interface of the electronic device in any suitable manner in response to detected user inputs indicative of such a first functionality type. For example, the motion sensor circuitry data may control movement of a cursor, while a tap of the second input component may "click" the cursor at its current location, while a hold of the second input component may start a "highlight" operation at the current location of the cursor, while a tap of the third input component may open an option dialogue box at the current location of the cursor, while a hold of the third input component may start a "scroll" operation at the current location of the cursor, while a tap of both the second and third input components simultaneously may initiate a switch event at the current location of the cursor.

However, if it is determined that the first input component is toggled on, then operation 506 may advance from suboperation 508a to one of suboperations 508c-508e, at which only a first functionality type of the input assembly may be detected. For example, the second functionality type of operation 508c may include a paintbrush functionality type, which may include being operative to generate a paintbrush cursor type of control data (e.g., for controlling cursor 112c on screen 112s in a second manner as if the input assembly were a paintbrush input tool), where, for example, motion sensor circuitry of the input assembly may be operative to detect any movement of the input assembly in three-dimensional space (e.g., direction, acceleration, deceleration, etc.), as may occur when a user moves in space its finger wearing the input assembly, while a second one of the input components (e.g., a right input component 210b, 210b', 210b", etc.) may be operative to detect any tap event or any hold event as may occur when a user interacts with that input component using a finger different than the finger wearing the input assembly (e.g., a right hand middle finger MF when a right hand index finger IF is wearing the input assembly). The system (e.g., the processor of the input assembly and/or the processor of the electronic device (e.g., in combination with any application(s) running thereon)) may be configured to generate and/or receive control data operative to control a cursor or other instrument of a user interface of the electronic device in any suitable manner in response to detected user inputs indicative of such a second functionality type. For example, the motion sensor circuitry data may control movement of a cursor, while a tap of the second input component may "adjust" the color of cursor's paintbrush at its current location, while a hold of the second input component may start a "painting" operation at the current location of the cursor and continue with movement of the cursor until the hold of the second input component ends.

The third functionality type of operation 508d may include a pencil functionality type, which may include being operative to generate a pencil cursor type of control data (e.g., for controlling cursor 112c on screen 112s in a third manner as if the input assembly were a pencil input tool (e.g., a tool thinner and/or sharper than a paintbrush tool)), where, for example, motion sensor circuitry of the input assembly may be operative to detect any movement of the input assembly in three-dimensional space (e.g., direction, acceleration, deceleration, etc.), as may occur when a user moves in space its finger wearing the input assembly, while a third one of the input components (e.g., a left input component 210c, 210c', 210c", etc.) may be operative to detect any tap event or any hold event as may occur when a user interacts with that input component using a finger different than the finger wearing the input assembly (e.g., a right hand thumb TM when a right hand index finger IF is wearing the input assembly). The system (e.g., the processor of the input assembly and/or the processor of the electronic device (e.g., in combination with any application(s) running thereon)) may be configured to generate and/or receive control data operative to control a cursor or other instrument of a user interface of the electronic device in any suitable manner in response to detected user inputs indicative of such a third functionality type. For example, the motion sensor circuitry data may control movement of a cursor (e.g., direction along screen 112s to adjust position of cursor on screen and/or rotation about axis perpendicular to the screen to adjust angle of pencil tool to screen and/or distance from the screen to adjust size of the pencil tip), while a tap of the third input component may "adjust" the cursor between a pencil and an eraser at its current location, while a hold of the third input component may start a "drawing" or "erasing" operation at the current location of the cursor and continue with movement of the cursor until the hold of the third input component ends.

The fourth functionality type of operation 508e may include a trackpad functionality type, which may include being operative to generate a trackpad type of control data (e.g., for enabling movement of cursor 112c on screen 112s in a fourth manner according to detected movement along a trackpad input component and/or for enabling a drawing input according to detected input along a trackpad input component)), where, for example, at a current location of a cursor, a fourth one of the input components (e.g., a bottom trackpad input component 210d, 210d', 210d", etc.) may be operative to detect any trackpad gesture event (e.g., tracing the segments of a character (e.g., a letter "A")) as may occur when a user interacts with that input component using a finger different than the finger wearing the input assembly (e.g., a right hand thumb TM when a right hand index finger IF is wearing the input assembly), while a second one of the input components (e.g., a right input component 210b, 210b', 210b", etc.) may be operative to detect any tap event or any hold event as may occur when a user interacts with that input component using a finger different than the finger wearing the input assembly (e.g., a right hand middle finger MF when a right hand index finger IF is wearing the input assembly). The system (e.g., the processor of the input assembly and/or the processor of the electronic device (e.g., in combination with any application(s) running thereon)) may be configured to generate and/or receive control data operative to control a cursor or other instrument of a user interface of the electronic device in any suitable manner in response to detected user inputs indicative of such a fourth functionality type. For example, the motion sensor circuitry data may control movement of a cursor (e.g., direction along screen 112s to adjust position of cursor on screen and/or rotation about axis perpendicular to the screen to adjust font type of trackpad tool to screen and/or distance from the screen to adjust size of the trackpad tool), while a tap of the second input component may "select" the current cursor position as the position for the input of an upcoming trackpad tool, while a hold of the second input component may start a trackpad input event at the current location of the cursor and utilize any input detected by the fourth input component during such holding in order to define the trackpad input event (e.g., when the user is holding the second input component with its middle finger, the user may trace the letter "A" on the fourth input component trackpad with its thumb, and the system may be configured to process such user input to generate control data that may be operative to instruct the electronic device to enter a glyph for the character "A" at the selected location on the screen).

It is understood that the operations shown in process 500 of FIG. 5 are only illustrative and that existing operations may be modified or omitted, additional operations may be added, and the or der of certain operations may be altered. It is also the be understood that the above examples of suboperations for operation 506 are only exemplary, and the system may be configured to detect any suitable user inputs on a finger-wearable input assembly and to generate any suitable control data based on such detection that may be operative to control a user interface of a communicatively coupled electronic device in any suitable manner. For example, different combinations of presses and/or holds of one or more input components may be mapped to carrying out different user interface adjustments (e.g., tapping first input component 210a, followed by a 2 second hold of second input component 210b while double tapping third input component 210c may be detected and mapped (e.g., by application 103 and/or application 203) to a first adjustment of a provided user interface (e.g., increasing the font size of all displayed text), while tapping first input component 210a, followed by a 2 second hold of second input component 210b while double tapping first input component 210a may be detected and mapped (e.g., by application 103 and/or application 203) to a second adjustment of a provided user interface (e.g., decreasing the font size of all displayed text), while tapping first input component 210a, followed by a 90° rotation of the input assembly housing about the wearing finger followed by double tapping first input component 210a may be detected and mapped (e.g., by application 103 and/or application 203) to a third adjustment of a provided user interface (e.g., rotating the orientation of the displayed content by 90°).

While certain embodiments have been described herein with respect to an index finger of a right hand wearing the input assembly while the thumb and/or middle finger of that right hand being used to interact with certain input components provided about the input assembly, it is to be understood that an input assembly may be worn on any suitable finger of any suitable hand and any other suitable fingers may be used to interact with the various input components of the assembly. For example, an input assembly may be worn on a middle finger, while the adjacent index finger may easily access a left input component, the thumb may easily access the bottom input component, the adjacent ring finger may easily access a top input component, while the pinky finger may easily access a right input component. Additionally, in some embodiments, two or more input assemblies may be worn on different fingers of the same hand or on different hands of the same user or on different hands of different users and used simultaneously to communicate with an electronic device (e.g., via Bluetooth mesh technology) to control an electronic device user interface simultaneously or serially. In some embodiments, rather than two or three or four distinct input components being provided at different regions of the input assembly's housing structure for being accessed at different regions about a user's wearing finger, a single input component may circumscribe all or substantially all of a user's wearing finger (e.g., a band or ring shaped track pad) and inputs detected at different regions thereof may be mapped to different input types as if they were received by different distinct input components.

Therefore, an input assembly of this disclosure (e.g., an ultracompact fingertip input device ("UFID")) may enable remote information input using intuitive and natural gestures and/or handwriting motions. Ultimately, when paired with an electronic device providing a user interface, the input assembly may perform a range of functions that may ordinarily be carried out through physical and/or virtual keyboard/trackpad interfaces of such an electronic device. A simple and elegant design of such an input assembly may utilize the inherent cooperative nature of human fingers to achieve multi-functional input capability allowing the input assembly to be used with computing and/or display systems, large and small, to facilitate remote control and input with ease.

Any input component that may be provided by any input assembly described herein, such as one, some, or each of input components 210a, 210b, 210c, 210d, 210a', 210b', 210c', 210d', 210a", 210b", 210c", and 210d", may be provided by any suitable sensor, switch, button, or trackpad of any suitable type, including, but not limited to, an electrostatic or electromechanical or photoelectronic or electro-optical sensor, switch, button, or trackpad that may be operative to detect any suitable user input. For example, such an input component may be mechanically activated and/or optically activated (e.g., via a light source (e.g., an LED) and a light detector (e.g., a photodiode) for detecting a user input gesture). As just one example, such an input component may be provided by a TMG49037 gesture, color and proximity sensor module from ams AG of Austria, by a TMG3992 gesture, color, ALS, and proximity sensor module from ams AG of Austria, and/or the like.

When an input assembly is provided with a rear open end (e.g., rear open end 201ro or rear open end 201ro'), the input assembly may be translated along a longitudinal axis of a user's wearing finger (e.g., along axis FY of FIGS. 2B-2E) between a first position for active functional use by the user (e.g., a position at which the rear open end surrounds the user's wearing finger proximate the tip of the user's wearing finger (see, e.g., FIGS. 2A, 2C, and 2D)) and a second position for passive storage or holding (e.g., a position at which the rear open end surrounds the user's wearing finger between the second and third knuckles (e.g., a position where a typical decorative ring may be worn)). Any suitable auxiliary sensor circuitry (e.g., circuitry 210g) may be configured to detect translation of the input assembly along the wearing finger between such positions and may, accordingly, transition the input assembly between an active functional mode and a passive standby mode.

Moreover, the processes described with respect to any aspects of the disclosure may each be implemented by software, but may also be implemented in hardware, firmware, or any combination of software, hardware, and firmware. They each may also be embodied as computer-readable code recorded on a computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 and/or memory 204 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to electronic device 100 via communications component 106 and/or assembly 200 via communications component 206). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that each process may be enabled by any suitable software construct, firmware construct, one or more hardware components, or a combination thereof. For example, each process may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of program modules of system 1 may be of any suitable architecture.

While there have been described finger-wearable input assemblies for controlling an electronic device and methods for using finger-wearable input assemblies for controlling an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "up" and "down," "front" and "rear," "top" and "bottom" and "side," "left" and "right," "above" and "below," "length" and "width" and "thickness" and "diameter" and "cross-section" and "longitudinal," "X-" and "Y-" and "Z-," and the like, may be used herein only for convenience, and that no fixed or absolute directional or orientational limitations are intended by the use of these terms. For example, the components of an input assembly can have any desired orientation. If reoriented, different directional or orientational terms may need to be used in their description, but that will not alter their fundamental nature as within the scope and spirit of the subject matter described herein in any way.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Thus, references to the details of the described embodiments are not intended to limit their scope.

What is claimed is:

1. An input assembly for controlling an electronic device, the input assembly comprising:
    a housing structure having a cuboid shape with six faces providing:
        an external surface; and
        an internal surface that at least partially defines a passageway operative to receive a first digit of a user's hand for wearing the input assembly;
    a plurality of sensors at least partially protected by the housing structure, the plurality of sensors comprising:
        a first sensor operative to detect, at a first portion of the external surface, a first touch event by a second digit of the user's hand when the input assembly is worn by the first digit, wherein the first sensor is a capacitive switch;
        a second sensor operative to detect, at a second portion of the external surface, a second touch event by a third digit of the user's hand when the input assembly is worn by the first digit, wherein the second sensor is a capacitive switch;
        a third sensor operative to detect, at a third portion of the external surface, a third touch event by a third digit of the user's hand when the input assembly is worn by the first digit wherein the third sensor is a capacitive switch; and
        a fourth sensor operative to detect, at a fourth portion of the external surface, a fourth touch event by a fourth digit of the user's hand when the input assembly is worn by the first digit, wherein the fourth sensor is a trackpad;
        wherein the first portion of the external surface and the fourth portion of the external surface are first and fourth faces of the cuboid shape on opposites sides of the passageway; and
        wherein the second portion of the external surface and the third portion of the external surface are second and third faces of the cuboid shape on opposite sides of the passageway; and
    a processor operative to generate control data based on the first touch event, the second touch event, the third touch event or the fourth touch event, for at least partially controlling an action of a user interface of the electronic device.

2. The input assembly of claim 1, wherein:
    the first portion of the external surface and the second portion of the external surface are on adjacent sides of the passageway; and
    the first portion of the external surface and the third portion of the external surface are on adjacent sides of the passageway.

3. The input assembly of claim 1, wherein:
    the passageway extends between a first open end and a second open end; and
    a tip of the first digit extends out from the passageway through the second open end when the input assembly is worn by the first digit.

4. The input assembly of claim 1, wherein:
    the passageway extends between an open end and a closed end; and
    a tip of the first digit is positioned within the passageway when the input assembly is worn by the first digit.

5. The input assembly of claim 1, wherein the input assembly further comprises communication circuitry operative to wirelessly communicate the control data to the electronic device.

6. The input assembly of claim 1, wherein the plurality of sensors further comprises a fifth sensor operative to detect, within the passageway, a characteristic of the first digit when the input assembly is worn by the first digit.

7. The input assembly of claim 6, wherein the processor is operative to generate the control data based on the characteristic and the first touch event, the second touch event, the third touch event or the fourth touch event.

8. The input assembly of claim 6, wherein the characteristic comprises at least one of a biometric characteristic of the first digit, presence of the first digit within the passageway, rotation of the first digit with respect to the internal surface, or translation of the first digit with respect to the internal surface.

9. The input assembly of claim 1, further comprising a motion sensor operative to detect a motion event of the first digit when the input assembly is worn by the first digit.

10. The input assembly of claim 9, wherein:
    the first sensor is operative to detect, at the first portion of the external surface, one or more first touch events by one or more digits of the user's hand other than the first digit when the input assembly is worn by the first digit; and
    the processor is further operative to:
        determine a state of the input assembly based on the one or more first touch events;
        in accordance with a determination that the input assembly is in a first state, generate first control data based on simultaneous detection of the second touch event and the motion event for at least partially controlling a first action of the electronic device; and
        in accordance with a determination the input assembly is in a second state different than the first state, generate second control data based on simultaneous detection of the second touch event and the motion event for at least partially controlling a second action of the electronic device that is different than the first action.

11. The input assembly of claim 10, wherein determining the state of the input assembly comprises determining the state to be the first state when a number of the one or more first touch events is even and determining the state to be the second state when the number of the one or more first touch events is odd.

12. The input assembly of claim 10, wherein the processor is further operative to:
    in accordance with a determination that the input assembly is in the first state, generate third control data based on simultaneous detection of the third touch event and the motion event for at least partially controlling a third action of the electronic device that is different from the first action and the second action; and
    in accordance with a determination the input assembly is in the second state, generate fourth control data based on simultaneous detection of the third touch event and the motion event for at least partially controlling a fourth action of the electronic device that is different than the first action, the second action, and the third action.

13. The input assembly of claim 12, wherein the processor is further operative to:
in accordance with a determination the input assembly is in the second state, generate fifth control data based on simultaneous detection of the second touch event and the fourth touch event for at least partially controlling a fifth action of the electronic device that is different than the first action, the second action, the third action, and the fourth action.

14. The input assembly of claim 10, wherein the processor is further operative to:
generate third control data based on the motion event detected prior to the second touch event for at least partially controlling a third action of the electronic device that is different from the first action and the second action.

15. An input assembly for controlling an electronic device, the input assembly comprising:
a housing structure providing:
an external surface; and
an internal surface that at least partially defines a passageway operative to receive a first digit of a user's hand for wearing the input assembly;
a plurality of sensors at least partially protected by the housing structure, the plurality of sensors comprising:
a first sensor operative to detect, at a first portion of the external surface, one or more first touch events by one or more digits of the user's hand other than the first digit when the input assembly is worn by the first digit;
a second sensor operative to detect, at a second portion of the external surface, a second touch event by any digit of the user's hand other than the first digit when the input assembly is worn by the first digit; and
a motion sensor operative to detect a motion event of the first digit when the input assembly is worn by the first digit; and
a processor operative to:
determine a state of the input assembly based on the one or more first touch events;
in accordance with a determination that the input assembly is in a first state, generate first control data based on simultaneous detection of the second touch event and the motion event for at least partially controlling a first action of the electronic device; and
in accordance with a determination the input assembly is in a second state different than the first state, generate second control data based on simultaneous detection of the second touch event and the motion event for at least partially controlling a second action of the electronic device that is different than the first action.

16. The input assembly of claim 15, wherein determining the state of the input assembly comprises determining the state to be the first state when a number of the one or more first touch events is even and determining the state to be the second state when the number of the one or more first touch events is odd.

17. The input assembly of claim 15, wherein the plurality of sensors further comprises a fourth sensor operative to detect, at a fourth portion of the external surface, a fourth touch event by any digit of the user's hand other than the first digit when the input assembly is worn by the first digit, and wherein the plurality of sensors further comprises a third sensor operative to detect, at a third portion of the external surface, a third touch event by any digit of the user's hand other than the first digit when the input assembly is worn by the first digit, and wherein the processor is further operative to:
in accordance with a determination that the input assembly is in the first state, generate third control data based on simultaneous detection of the third touch event and the motion event for at least partially controlling a third action of the electronic device that is different from the first action and the second action; and
in accordance with a determination the input assembly is in the second state, generate fourth control data based on simultaneous detection of the third touch event and the motion event for at least partially controlling a fourth action of the electronic device that is different than the first action, the second action, and the third action.

18. The input assembly of claim 17, wherein the plurality of sensors further comprises a fourth sensor operative to detect, at a fourth portion of the external surface, a fourth touch event by any digit of the user's hand other than the first digit when the input assembly is worn by the first digit, and wherein the processor is further operative to:
in accordance with a determination the input assembly is in the second state, generate fifth control data based on simultaneous detection of the second touch event and the fourth touch event for at least partially controlling a fifth action of the electronic device that is different than the first action, the second action, the third action, and the fourth action.

19. The input assembly of claim 15, wherein the processor is further operative to:
generate third control data based on the motion event detected prior to the second touch event for at least partially controlling a third action of the electronic device that is different from the first action and the second action.

20. A non-transitory computer-readable storage medium storing one or more programs for execution at an input assembly for controlling an electronic device, the input assembly comprising:
a housing structure providing:
an external surface; and
an internal surface that at least partially defines a passageway operative to receive a first digit of a user's hand for wearing the input assembly;
a plurality of sensors at least partially protected by the housing structure, the plurality of sensors comprising:
a first sensor operative to detect, at a first portion of the external surface, one or more first touch events by one or more digits of the user's hand other than the first digit when the input assembly is worn by the first digit;
a second sensor operative to detect, at a second portion of the external surface, a second touch event by any digit of the user's hand other than the first digit when the input assembly is worn by the first digit; and
a motion sensor operative to detect a motion event of the first digit when the input assembly is worn by the first digit;
wherein the one or more programs include instructions which, when executed by the device cause the device to:
determine a state of the input assembly based on the one or more first touch events;
in accordance with a determination that the input assembly is in a first state, generate first control data based on simultaneous detection of the second touch event and the motion event for at least partially controlling a first action of the electronic device; and in accordance with a determination the input assembly is in a second state different than the first state, generate second control data based on simultaneous detection of the second touch event and the motion event for at least partially controlling a second action of the electronic device that is different than the first action.

* * * * *

UNITED STATES PATENT AND TRADEMARK OFFICE
CERTIFICATE OF CORRECTION

| | |
|---|---|
| PATENT NO. | : 11,275,456 B2 |
| APPLICATION NO. | : 16/834888 |
| DATED | : March 15, 2022 |
| INVENTOR(S) | : Jun Xie et al. |

It is certified that error appears in the above-identified patent and that said Letters Patent is hereby corrected as shown below:

In the Claims

In Column 27, Line 32, in Claim 1, delete "digit" and insert --digit,--.

In Column 29, Lines 59-63, in Claim 17, after "15," delete "wherein the plurality of sensors further comprises a fourth sensor operative to detect, at a fourth portion of the external surface, a fourth touch event by any digit of the user's hand other than the first digit when the input assembly is worn by the first digit, and".

Signed and Sealed this
Twenty-fourth Day of May, 2022

Katherine Kelly Vidal
*Director of the United States Patent and Trademark Office*